United States Patent
Fullerton et al.

(10) Patent No.: US 9,298,281 B2
(45) Date of Patent: Mar. 29, 2016

(54) MAGNETIC VECTOR SENSOR POSITIONING AND COMMUNICATIONS SYSTEM

(71) Applicant: Correlated Magnetics Research, LLC., New Hope, AL (US)

(72) Inventors: Larry W. Fullerton, New Hope, AL (US); Mark D. Roberts, Huntsville, AL (US)

(73) Assignee: CORRELATED MAGNETICS RESEARCH, LLC., New Hope, AL (US)

( * ) Notice: Subject to any disclaimer, the term of this patent is extended or adjusted under 35 U.S.C. 154(b) by 90 days.

(21) Appl. No.: 14/106,736

(22) Filed: Dec. 14, 2013

(65) Prior Publication Data
US 2014/0184505 A1 Jul. 3, 2014

Related U.S. Application Data

(60) Provisional application No. 61/746,456, filed on Dec. 27, 2012.

(51) Int. Cl.

| | |
|---|---|
| G06F 3/033 | (2013.01) |
| G06F 3/0346 | (2013.01) |
| G06F 3/041 | (2006.01) |
| G06F 3/038 | (2013.01) |
| G06F 1/16 | (2006.01) |
| G06F 3/01 | (2006.01) |
| G06F 3/0338 | (2013.01) |
| G06F 3/046 | (2006.01) |

(Continued)

(52) U.S. Cl.
CPC .............. *G06F 3/0346* (2013.01); *A63F 13/21* (2014.09); *A63F 13/235* (2014.09); *B60K 37/06* (2013.01); *G06F 1/169* (2013.01); *G06F 3/014* (2013.01); *G06F 3/038* (2013.01); *G06F 3/0338* (2013.01); *G06F 3/03543* (2013.01); *G06F 3/03544* (2013.01); *G06F 3/03545* (2013.01); *G06F 3/041* (2013.01); *G06F 3/046* (2013.01); *G06F 3/0418* (2013.01); *B60K 2350/102* (2013.01); *B60K 2350/104* (2013.01); *B60K 2350/1024* (2013.01)

(58) Field of Classification Search
None
See application file for complete search history.

(56) References Cited

U.S. PATENT DOCUMENTS

| | | | |
|---|---|---|---|
| 93,931 | A | 8/1869 | Westcott |
| 342,666 | A | 5/1886 | Williams |

(Continued)

FOREIGN PATENT DOCUMENTS

| | | | |
|---|---|---|---|
| CN | 1615573 A | 5/2005 | |
| DE | 2938782 A1 | 4/1981 | |

(Continued)

OTHER PUBLICATIONS

Kim, Pill Soo, Kim, Yong, Field and Thermal Modeling of Magnetizing Fixture by Impulse, Power Electronics and Drive Systems, 2003. The fifth conference on, Dec. 2003,1301-1306.

(Continued)

*Primary Examiner* — Muhammad N Edun
(74) *Attorney, Agent, or Firm* — William J. Tucker

(57) ABSTRACT

A system is described herein for monitoring the movement of one or more magnets located external to a device using the vector data from one or more magnetic vector sensors incorporated in the device to determine a position and/or to communicate information.

27 Claims, 17 Drawing Sheets

(51) Int. Cl.
  *G06F 3/0354* (2013.01)
  *B60K 37/06* (2006.01)
  *A63F 13/235* (2014.01)
  *A63F 13/21* (2014.01)

(56) References Cited

U.S. PATENT DOCUMENTS

| | | |
|---|---|---|
| 361,248 A | 4/1887 | Winton |
| 381,968 A | 5/1888 | Tesla |
| 400,809 A | 4/1889 | Van Depoele |
| 405,109 A | 5/1889 | Williams |
| 450,543 A | 4/1891 | Van Depoele |
| 493,858 A | 3/1893 | Edison |
| 675,323 A | 5/1901 | Clark |
| 687,292 A | 11/1901 | Armstrong |
| 996,933 A | 7/1911 | Lindquist |
| 1,024,418 A | 4/1912 | Podlesak |
| 1,081,462 A | 12/1913 | Patton |
| 1,171,351 A | 2/1916 | Neuland |
| 1,180,489 A | 4/1916 | Geist |
| 1,184,056 A | 5/1916 | Deventer |
| 1,236,234 A | 8/1917 | Troje |
| 1,252,289 A | 1/1918 | Murray, Jr. |
| 1,290,190 A | 1/1919 | Herrick |
| 1,301,135 A | 4/1919 | Karasick |
| 1,307,342 A | 6/1919 | Brown |
| 1,312,546 A | 8/1919 | Karasick |
| 1,323,546 A | 8/1919 | Karasick |
| 1,554,236 A | 1/1920 | Simmons |
| 1,343,751 A | 6/1920 | Simmons |
| 1,544,010 A | 6/1925 | Jordan |
| 1,554,254 A | 9/1925 | Zbinden |
| 1,624,741 A | 12/1926 | Leppke et al. |
| 1,784,256 A | 12/1930 | Stout |
| 1,785,643 A | 12/1930 | Noack et al. |
| 1,823,326 A | 9/1931 | Legg |
| 1,895,129 A | 1/1933 | Jones |
| 1,975,175 A | 10/1934 | Scofield |
| 2,048,161 A | 7/1936 | Klaiber |
| 2,058,339 A | 10/1936 | Metzger |
| 2,147,482 A | 12/1936 | Butler |
| 2,111,643 A | 3/1938 | Salvatori |
| 2,130,213 A | 9/1938 | Wolf et al. |
| 2,158,132 A | 5/1939 | Legg |
| 2,186,074 A | 1/1940 | Koller |
| 2,240,035 A | 4/1941 | Catherall |
| 2,243,555 A | 5/1941 | Faus |
| 2,245,268 A | 6/1941 | Goss et al. |
| 2,269,149 A | 1/1942 | Edgar |
| 2,286,897 A | 6/1942 | Costa et al. |
| 2,296,754 A | 9/1942 | Wolf et al. |
| 2,315,045 A | 3/1943 | Breitenstein |
| 2,316,616 A | 4/1943 | Powell |
| 2,327,748 A | 8/1943 | Smith |
| 2,337,248 A | 12/1943 | Koller |
| 2,337,249 A | 12/1943 | Koller |
| 2,362,151 A | 11/1944 | Ostenberg |
| 2,389,298 A | 11/1945 | Ellis |
| 2,401,887 A | 6/1946 | Sheppard |
| 2,409,857 A | 10/1946 | Hines et al. |
| 2,414,653 A | 1/1947 | Lokholder |
| 2,426,322 A | 8/1947 | Pridham |
| 2,438,231 A | 3/1948 | Shultz |
| 2,471,634 A | 5/1949 | Vennice |
| 2,472,127 A | 6/1949 | Slason |
| 2,475,200 A | 7/1949 | Roys |
| 2,475,456 A | 7/1949 | Norlander |
| 2,483,895 A | 10/1949 | Fisher |
| 2,508,305 A | 5/1950 | Teetor |
| 2,513,226 A | 6/1950 | Wylie |
| 2,514,927 A | 7/1950 | Bernhard |
| 2,520,828 A | 8/1950 | Bertschi |
| 2,540,796 A | 2/1951 | Stanton |
| 2,544,077 A | 3/1951 | Gardner |
| 2,565,624 A | 8/1951 | Phelon |
| 2,570,625 A | 10/1951 | Zimmerman et al. |
| 2,640,955 A | 6/1953 | Fisher |
| 2,690,349 A | 9/1954 | Teetor |
| 2,694,164 A | 11/1954 | Geppelt |
| 2,694,613 A | 11/1954 | Williams |
| 2,701,158 A | 2/1955 | Schmitt |
| 2,722,617 A | 11/1955 | Cluwen et al. |
| 2,740,946 A | 4/1956 | Geneslay |
| 2,770,759 A | 11/1956 | Ahlgren |
| 2,787,719 A | 4/1957 | Thomas |
| 2,820,411 A | 1/1958 | Park |
| 2,825,863 A | 3/1958 | Krupen |
| 2,837,366 A | 6/1958 | Loeb |
| 2,842,688 A | 7/1958 | Martin |
| 2,853,331 A | 9/1958 | Teetor |
| 2,888,291 A | 5/1959 | Scott et al. |
| 2,896,991 A | 7/1959 | Martin, Jr. |
| 2,900,592 A | 8/1959 | Baruch |
| 2,935,352 A | 5/1960 | Heppner |
| 2,935,353 A | 5/1960 | Loeb |
| 2,936,437 A | 5/1960 | Fraser et al. |
| 2,959,747 A | 11/1960 | Challacombe et al. |
| 2,962,318 A | 11/1960 | Teetor |
| 3,024,374 A | 3/1962 | Stauder |
| 3,055,999 A | 9/1962 | Lucas |
| 3,089,986 A | 5/1963 | Gauthier |
| 3,100,292 A | 8/1963 | Warner, Jr. et al. |
| 3,102,205 A | 8/1963 | Combs |
| 3,102,314 A | 9/1963 | Alderfer |
| 3,105,153 A | 9/1963 | James, Jr. |
| 3,149,255 A | 9/1964 | Trench |
| 3,151,902 A | 10/1964 | Ahlgren |
| 3,204,995 A | 9/1965 | Teetor |
| 3,208,296 A | 9/1965 | Baermann |
| 3,238,399 A | 3/1966 | Johanees et al. |
| 3,273,104 A | 9/1966 | Krol |
| 3,288,511 A | 11/1966 | Tavano |
| 3,301,091 A | 1/1967 | Reese |
| 3,351,368 A | 11/1967 | Sweet |
| 3,382,386 A | 5/1968 | Schlaeppi |
| 3,408,104 A | 10/1968 | Raynes |
| 3,414,309 A | 12/1968 | Tresemer |
| 3,425,729 A | 2/1969 | Bisbing |
| 2,932,545 A | 4/1969 | Foley |
| 3,468,576 A | 9/1969 | Beyer et al. |
| 3,474,366 A | 10/1969 | Barney |
| 3,496,871 A | 2/1970 | Stengel |
| 3,500,090 A | 3/1970 | Baermann |
| 3,521,216 A | 7/1970 | Tolegian |
| 3,645,650 A | 2/1972 | Laing |
| 3,668,670 A | 6/1972 | Andersen |
| 3,684,992 A | 8/1972 | Huguet et al. |
| 3,690,393 A | 9/1972 | Guy |
| 3,696,251 A | 10/1972 | Last et al. |
| 3,696,258 A | 10/1972 | Anderson et al. |
| 3,707,924 A | 1/1973 | Barthalon et al. |
| 3,790,197 A | 2/1974 | Parker |
| 3,791,309 A | 2/1974 | Baermann |
| 3,802,034 A | 4/1974 | Bookless |
| 3,803,433 A | 4/1974 | Ingenito |
| 3,808,577 A | 4/1974 | Mathauser |
| 3,836,801 A | 9/1974 | Yamashita et al. |
| 3,845,430 A | 10/1974 | Petkewicz et al. |
| 3,893,059 A | 7/1975 | Nowak |
| 3,976,316 A | 8/1976 | Laby |
| 4,079,558 A | 3/1978 | Forham |
| 4,114,305 A | 9/1978 | Wohlert et al. |
| 4,115,040 A | 9/1978 | Knorr |
| 4,117,431 A | 9/1978 | Eicher |
| 4,129,187 A | 12/1978 | Wengryn et al. |
| 4,129,846 A | 12/1978 | Yablochnikov |
| 4,140,932 A | 2/1979 | Wohlert |
| 4,209,905 A | 7/1980 | Gillings |
| 4,222,489 A | 9/1980 | Hutter |
| 4,232,535 A | 11/1980 | Caldwell |
| 4,296,394 A | 10/1981 | Ragheb |
| 4,340,833 A | 7/1982 | Sudo et al. |
| 4,352,960 A | 10/1982 | Dormer et al. |
| 4,363,980 A | 12/1982 | Petersen |

(56) References Cited

U.S. PATENT DOCUMENTS

| | | |
|---|---|---|
| 4,399,595 A | 8/1983 | Yoon et al. |
| 4,416,127 A | 11/1983 | Gomez-Olea Naveda |
| 4,421,118 A | 12/1983 | Dow et al. |
| 4,451,811 A | 5/1984 | Hoffman |
| 4,453,294 A | 6/1984 | Morita |
| 4,454,426 A | 6/1984 | Benson |
| 4,460,855 A | 7/1984 | Kelly |
| 4,500,827 A | 2/1985 | Merritt et al. |
| 4,517,483 A | 5/1985 | Hucker et al. |
| 4,535,278 A | 8/1985 | Asakawa |
| 4,547,756 A | 10/1985 | Miller et al. |
| 4,629,131 A | 12/1986 | Podell |
| 4,645,283 A | 2/1987 | MacDonald et al. |
| 4,649,925 A | 3/1987 | Dow et al. |
| 4,680,494 A | 7/1987 | Grosjean |
| 4,767,378 A | 8/1988 | Obermann |
| 4,785,816 A | 11/1988 | Dow et al. |
| 4,808,955 A | 2/1989 | Godkin et al. |
| 4,814,654 A | 3/1989 | Gerfast |
| 4,837,539 A | 6/1989 | Baker |
| 4,849,749 A | 7/1989 | Fukamachi et al. |
| 4,856,631 A | 8/1989 | Okamoto et al. |
| 4,912,727 A | 3/1990 | Schubert |
| 4,924,123 A | 5/1990 | Hamajima et al. |
| 4,941,236 A | 7/1990 | Sherman et al. |
| 4,956,625 A | 9/1990 | Cardone et al. |
| 4,980,593 A | 12/1990 | Edmundson |
| 4,993,950 A | 2/1991 | Mensor, Jr. |
| 4,996,457 A | 2/1991 | Hawsey et al. |
| 5,013,949 A | 5/1991 | Mabe, Jr. |
| 5,020,625 A | 6/1991 | Yamauchi et al. |
| 5,050,276 A | 9/1991 | Pemberton |
| 5,062,855 A | 11/1991 | Rincoe |
| 5,123,843 A | 6/1992 | Van der Zel et al. |
| 5,139,383 A | 8/1992 | Polyak et al. |
| 5,179,307 A | 1/1993 | Porter |
| 5,190,325 A | 3/1993 | Doss-Desouza |
| 5,302,929 A | 4/1994 | Kovacs |
| 5,309,680 A | 5/1994 | Kiel |
| 5,345,207 A | 9/1994 | Gebele |
| 5,347,186 A | 9/1994 | Konotchick |
| 5,349,258 A | 9/1994 | Leupold et al. |
| 5,367,891 A | 11/1994 | Furuyama |
| 5,383,049 A | 1/1995 | Carr |
| 5,394,132 A | 2/1995 | Poil |
| 5,396,140 A | 3/1995 | Goldie et al. |
| 5,425,763 A | 6/1995 | Stemmann |
| 5,434,549 A | 7/1995 | Hirabayashi et al. |
| 5,440,997 A | 8/1995 | Crowley |
| 5,452,663 A | 9/1995 | Berdut |
| 5,461,386 A | 10/1995 | Knebelkamp |
| 5,485,435 A | 1/1996 | Matsuda et al. |
| 5,492,572 A | 2/1996 | Schroeder et al. |
| 5,495,221 A | 2/1996 | Post |
| 5,512,732 A | 4/1996 | Yagnik et al. |
| 5,570,084 A | 10/1996 | Ritter et al. |
| 5,582,522 A | 12/1996 | Johnson |
| 5,604,960 A | 2/1997 | Good |
| 5,631,093 A | 5/1997 | Perry et al. |
| 5,631,618 A | 5/1997 | Trumper et al. |
| 5,633,555 A | 5/1997 | Ackermann et al. |
| 5,635,889 A | 6/1997 | Stelter |
| 5,637,972 A | 6/1997 | Randall et al. |
| 5,650,681 A | 7/1997 | DeLerno |
| 5,730,155 A | 3/1998 | Allen |
| 5,759,054 A | 6/1998 | Spadafore |
| 5,788,493 A | 8/1998 | Tanaka et al. |
| 5,789,878 A | 8/1998 | Kroeker et al. |
| 5,818,132 A | 10/1998 | Konotchick |
| 5,852,393 A | 12/1998 | Reznik et al. |
| 5,902,185 A | 5/1999 | Kubiak et al. |
| 5,921,357 A | 7/1999 | Starkovich et al. |
| 5,935,155 A | 8/1999 | Humayun et al. |
| 5,956,778 A | 9/1999 | Godoy |
| 5,975,714 A | 11/1999 | Vetorino et al. |
| 5,983,406 A | 11/1999 | Meyerrose |
| 5,988,336 A | 11/1999 | Wendt et al. |
| 6,000,484 A | 12/1999 | Zoretich et al. |
| 6,039,759 A | 3/2000 | Carpentier et al. |
| 6,040,642 A | 3/2000 | Ishiyama |
| 6,047,456 A | 4/2000 | Yao et al. |
| 6,072,251 A | 6/2000 | Markle |
| 6,074,420 A | 6/2000 | Eaton |
| 6,104,108 A | 8/2000 | Hazelton et al. |
| 6,115,849 A | 9/2000 | Meyerrose |
| 6,118,271 A | 9/2000 | Ely et al. |
| 6,120,283 A | 9/2000 | Cousins |
| 6,125,955 A | 10/2000 | Zoretich et al. |
| 6,142,779 A | 11/2000 | Siegel et al. |
| 6,157,100 A | 12/2000 | Mielke |
| 6,170,131 B1 | 1/2001 | Shin |
| 6,181,110 B1 | 1/2001 | Lampis |
| 6,187,041 B1 | 2/2001 | Garonzik |
| 6,188,147 B1 | 2/2001 | Hazelton et al. |
| 6,205,012 B1 | 3/2001 | Lear |
| 6,210,033 B1 | 4/2001 | Karkos, Jr. et al. |
| 6,224,374 B1 | 5/2001 | Mayo |
| 6,234,833 B1 | 5/2001 | Tsai et al. |
| 6,273,918 B1 | 8/2001 | Yuhasz et al. |
| 6,275,778 B1 | 8/2001 | Shimada et al. |
| 6,285,097 B1 | 9/2001 | Hazelton et al. |
| 6,313,551 B1 | 11/2001 | Hazelton |
| 6,313,552 B1 | 11/2001 | Boast |
| 6,387,096 B1 | 5/2002 | Hyde, Jr. |
| 6,422,533 B1 | 7/2002 | Harms |
| 6,457,179 B1 | 10/2002 | Prendergast |
| 6,467,326 B1 | 10/2002 | Garrigus |
| 6,478,681 B1 | 11/2002 | Overaker et al. |
| 6,517,560 B1 | 2/2003 | Toth et al. |
| 6,540,515 B1 | 4/2003 | Tanaka |
| 6,561,815 B1 | 5/2003 | Schmidt |
| 6,599,321 B2 | 7/2003 | Hyde, Jr. |
| 6,607,304 B1 | 8/2003 | Lake et al. |
| 6,608,540 B1 | 8/2003 | Hones et al. |
| 6,652,278 B2 | 11/2003 | Honkura et al. |
| 6,653,919 B2 | 11/2003 | Shih-Chung et al. |
| 6,720,698 B2 | 4/2004 | Galbraith |
| 6,747,537 B1 | 6/2004 | Mosteller |
| 6,768,230 B2 | 7/2004 | Cheung et al. |
| 6,821,126 B2 | 11/2004 | Neidlein |
| 6,841,910 B2 | 1/2005 | Gery |
| 6,842,332 B1 | 1/2005 | Rubenson et al. |
| 6,847,134 B2 | 1/2005 | Frissen et al. |
| 6,850,139 B1 | 2/2005 | Dettmann et al. |
| 6,862,748 B2 | 3/2005 | Prendergast |
| 6,913,471 B2 | 7/2005 | Smith |
| 6,927,657 B1 | 8/2005 | Wu |
| 6,936,937 B2 | 8/2005 | Tu et al. |
| 6,950,279 B2 | 9/2005 | Sasaki et al. |
| 6,952,060 B2 | 10/2005 | Goldner et al. |
| 6,954,938 B2 | 10/2005 | Emberty et al. |
| 6,954,968 B1 | 10/2005 | Sitbon |
| 6,971,147 B2 | 12/2005 | Halstead |
| 7,009,874 B2 | 3/2006 | Deak |
| 7,016,492 B2 | 3/2006 | Pan et al. |
| 7,031,160 B2 | 4/2006 | Tillotson |
| 7,033,400 B2 | 4/2006 | Currier |
| 7,065,860 B2 | 6/2006 | Aoki et al. |
| 7,066,739 B2 | 6/2006 | McLeish |
| 7,066,778 B2 | 6/2006 | Kretzschmar |
| 7,097,461 B2 | 8/2006 | Neidlein |
| 7,101,374 B2 | 9/2006 | Hyde, Jr. |
| 7,134,452 B2 | 11/2006 | Hiroshi et al. |
| 7,135,792 B2 | 11/2006 | Devaney et al. |
| 7,137,727 B2 | 11/2006 | Joseph et al. |
| 7,186,265 B2 | 3/2007 | Sharkawy et al. |
| 7,224,252 B2 | 5/2007 | Meadow, Jr. et al. |
| 7,264,479 B1 | 9/2007 | Lee |
| 7,276,025 B2 | 10/2007 | Roberts et al. |
| 7,309,934 B2 | 12/2007 | Tu et al. |
| 7,311,526 B2 | 12/2007 | Rohrbach et al. |
| 7,339,790 B2 | 3/2008 | Baker et al. |
| 7,344,380 B2 | 3/2008 | Neidlein et al. |
| 7,351,066 B2 | 4/2008 | DiFonzo et al. |

(56) References Cited

U.S. PATENT DOCUMENTS

| | | |
|---|---|---|
| 7,358,724 B2 | 4/2008 | Taylor et al. |
| 7,362,018 B1 | 4/2008 | Kulogo et al. |
| 7,364,433 B2 | 4/2008 | Neidlein |
| 7,381,181 B2 | 6/2008 | Lau et al. |
| 7,402,175 B2 | 7/2008 | Azar |
| 7,416,414 B2 | 8/2008 | Bozzone et al. |
| 7,438,726 B2 | 10/2008 | Erb |
| 7,444,683 B2 | 11/2008 | Prendergast et al. |
| 7,453,341 B1 | 11/2008 | Hildenbrand |
| 7,467,948 B2 | 12/2008 | Lindberg et al. |
| 7,498,914 B2 | 3/2009 | Miyashita et al. |
| 7,583,500 B2 | 9/2009 | Ligtenberg et al. |
| 7,628,173 B2 | 12/2009 | Rosko et al. |
| 7,637,746 B2 | 12/2009 | Lindberg et al. |
| 7,645,143 B2 | 1/2010 | Rohrbach et al. |
| 7,658,613 B1 | 2/2010 | Griffin et al. |
| 7,688,036 B2 | 3/2010 | Yarger et al. |
| 7,762,817 B2 | 7/2010 | Ligtenberg et al. |
| 7,775,567 B2 | 8/2010 | Ligtenberg et al. |
| 7,796,002 B2 | 9/2010 | Hashimoto et al. |
| 7,799,281 B2 | 9/2010 | Cook et al. |
| 7,808,349 B2 | 10/2010 | Fullerton et al. |
| 7,812,697 B2 | 10/2010 | Fullerton et al. |
| 7,817,004 B2 | 10/2010 | Fullerton et al. |
| 7,828,556 B2 | 11/2010 | Rodrigues |
| 7,832,897 B2 | 11/2010 | Ku |
| 7,837,032 B2 | 11/2010 | Smeltzer |
| 7,839,246 B2 | 11/2010 | Fullerton et al. |
| 7,843,297 B2 | 11/2010 | Fullerton et al. |
| 7,868,721 B2 | 1/2011 | Fullerton et al. |
| 7,871,272 B2 | 1/2011 | Firman, II et al. |
| 7,874,856 B1 | 1/2011 | Schriefer et al. |
| 7,901,216 B2 | 3/2011 | Rohrbach et al. |
| 7,903,397 B2 | 3/2011 | McCoy |
| 7,905,626 B2 | 3/2011 | Shantha et al. |
| 7,980,268 B2 | 7/2011 | Rosko et al. |
| 7,997,906 B2 | 8/2011 | Ligtenberg et al. |
| 8,002,585 B2 | 8/2011 | Zhou |
| 8,004,792 B2 | 8/2011 | Biskeborn et al. |
| 8,009,001 B1 | 8/2011 | Cleveland |
| 8,050,714 B2 | 11/2011 | Fadell et al. |
| 8,078,224 B2 | 12/2011 | Fadell et al. |
| 8,078,776 B2 | 12/2011 | Novotney et al. |
| 8,087,939 B2 | 1/2012 | Rohrbach et al. |
| 8,138,868 B2 | 3/2012 | Arnold |
| 8,138,869 B1 | 3/2012 | Lauder et al. |
| 8,143,982 B1 | 3/2012 | Lauder et al. |
| 8,143,983 B1 | 3/2012 | Lauder et al. |
| 8,165,634 B2 | 4/2012 | Fadell et al. |
| 8,177,560 B2 | 5/2012 | Rohrbach et al. |
| 8,179,219 B2 | 5/2012 | Fullerton |
| 8,187,006 B2 | 5/2012 | Rudisill et al. |
| 8,190,205 B2 | 5/2012 | Fadell et al. |
| 8,242,868 B2 | 8/2012 | Lauder et al. |
| 8,253,518 B2 | 8/2012 | Lauder et al. |
| 8,264,310 B2 | 9/2012 | Lauder et al. |
| 8,264,314 B2 | 9/2012 | Sankar |
| 8,271,038 B2 | 9/2012 | Fadell et al. |
| 8,271,705 B2 | 9/2012 | Novotney et al. |
| 8,297,367 B2 | 10/2012 | Chen et al. |
| 8,344,836 B2 | 1/2013 | Lauder et al. |
| 8,348,678 B2 | 1/2013 | Hardisty et al. |
| 8,354,767 B2 | 1/2013 | Pennander et al. |
| 8,390,411 B2 | 3/2013 | Lauder et al. |
| 8,390,412 B2 | 3/2013 | Lauder et al. |
| 8,390,413 B2 | 3/2013 | Lauder et al. |
| 8,395,465 B2 | 3/2013 | Lauder et al. |
| 8,398,409 B2 | 3/2013 | Schmidt |
| 8,435,042 B2 | 5/2013 | Rohrbach et al. |
| 8,454,372 B2 | 6/2013 | Lee |
| 8,467,829 B2 | 6/2013 | Fadell et al. |
| 8,497,753 B2 | 7/2013 | DiFonzo et al. |
| 8,514,042 B2 | 8/2013 | Lauder et al. |
| 8,535,088 B2 | 9/2013 | Gao et al. |
| 8,576,031 B2 | 11/2013 | Lauder et al. |
| 8,576,034 B2 | 11/2013 | Bilbrey et al. |
| 8,586,410 B2 | 11/2013 | Arnold et al. |
| 8,616,362 B1 | 12/2013 | Browne et al. |
| 8,648,679 B2 | 2/2014 | Lauder et al. |
| 8,664,044 B2 | 3/2014 | Jin et al. |
| 8,665,045 B2 | 3/2014 | Lauder et al. |
| 8,690,582 B2 | 4/2014 | Rohrbach et al. |
| 8,702,316 B2 | 4/2014 | DiFonzo et al. |
| 8,734,024 B2 | 5/2014 | Isenhour et al. |
| 8,752,200 B2 | 6/2014 | Varshavsky et al. |
| 8,757,893 B1 | 6/2014 | Isenhour et al. |
| 8,770,857 B2 | 7/2014 | DiFonzo et al. |
| 8,774,577 B2 | 7/2014 | Benjamin et al. |
| 8,781,273 B2 | 7/2014 | Benjamin et al. |
| 2002/0125977 A1 | 9/2002 | VanZoest |
| 2003/0170976 A1 | 9/2003 | Molla et al. |
| 2003/0179880 A1 | 9/2003 | Pan et al. |
| 2003/0187510 A1 | 10/2003 | Hyde |
| 2004/0003487 A1 | 1/2004 | Reiter |
| 2004/0155748 A1 | 8/2004 | Steingroever |
| 2004/0244636 A1 | 12/2004 | Meadow et al. |
| 2004/0251759 A1 | 12/2004 | Hirzel |
| 2005/0102802 A1 | 5/2005 | Sitbon et al. |
| 2005/0196484 A1 | 9/2005 | Khoshnevis |
| 2005/0231046 A1 | 10/2005 | Aoshima |
| 2005/0240263 A1 | 10/2005 | Fogarty et al. |
| 2005/0263549 A1 | 12/2005 | Scheiner |
| 2006/0066428 A1 | 3/2006 | McCarthy et al. |
| 2006/0111191 A1 | 5/2006 | Wise |
| 2006/0189259 A1 | 8/2006 | Park et al. |
| 2006/0198047 A1 | 9/2006 | Xue et al. |
| 2006/0214756 A1 | 9/2006 | Elliott et al. |
| 2006/0290451 A1 | 12/2006 | Prendergast et al. |
| 2006/0293762 A1 | 12/2006 | Schulman et al. |
| 2007/0072476 A1 | 3/2007 | Milan |
| 2007/0075594 A1 | 4/2007 | Sadler |
| 2007/0103266 A1 | 5/2007 | Wang et al. |
| 2007/0138806 A1 | 6/2007 | Ligtenberg et al. |
| 2007/0255400 A1 | 11/2007 | Parravicini et al. |
| 2007/0267929 A1 | 11/2007 | Pulnikov et al. |
| 2008/0139261 A1 | 6/2008 | Cho et al. |
| 2008/0181804 A1 | 7/2008 | Tanigawa et al. |
| 2008/0186683 A1 | 8/2008 | Ligtenberg et al. |
| 2008/0218299 A1 | 9/2008 | Arnold |
| 2008/0224806 A1 | 9/2008 | Ogden et al. |
| 2008/0272868 A1 | 11/2008 | Prendergast et al. |
| 2008/0282517 A1 | 11/2008 | Claro |
| 2009/0021333 A1 | 1/2009 | Fiedler |
| 2009/0058201 A1 | 3/2009 | Brennvall |
| 2009/0091195 A1 | 4/2009 | Hyde et al. |
| 2009/0146508 A1 | 6/2009 | Peng et al. |
| 2009/0167727 A1 | 7/2009 | Liu |
| 2009/0209173 A1 | 8/2009 | Arledge et al. |
| 2009/0230786 A1 | 9/2009 | Liu |
| 2009/0250576 A1 | 10/2009 | Fullerton et al. |
| 2009/0251256 A1 | 10/2009 | Fullerton et al. |
| 2009/0254196 A1 | 10/2009 | Cox et al. |
| 2009/0278642 A1 | 11/2009 | Fullerton et al. |
| 2009/0289090 A1 | 11/2009 | Fullerton et al. |
| 2009/0289749 A1 | 11/2009 | Fullerton et al. |
| 2009/0292371 A1 | 11/2009 | Fullerton et al. |
| 2010/0033280 A1 | 2/2010 | Bird et al. |
| 2010/0084928 A1 | 4/2010 | Yoshida et al. |
| 2010/0126857 A1 | 5/2010 | Polwart et al. |
| 2010/0167576 A1 | 7/2010 | Zhou |
| 2011/0026203 A1 | 2/2011 | Ligtenberg et al. |
| 2011/0190060 A1 | 8/2011 | Ketabdar |
| 2011/0210636 A1 | 9/2011 | Kuhlmann-Wilsdorf |
| 2011/0216030 A1* | 9/2011 | Lee ................ 345/174 |
| 2011/0227869 A1* | 9/2011 | Lai et al. ........... 345/174 |
| 2011/0234344 A1 | 9/2011 | Fullerton et al. |
| 2011/0248806 A1 | 10/2011 | Michael |
| 2011/0279206 A1 | 11/2011 | Fullerton et al. |
| 2012/0007704 A1 | 1/2012 | Nerl |
| 2012/0084051 A1 | 4/2012 | Hackner |
| 2012/0085753 A1 | 4/2012 | Fitch et al. |
| 2012/0235519 A1 | 9/2012 | Dyer et al. |
| 2012/0262261 A1 | 10/2012 | Sarai |
| 2013/0186209 A1 | 7/2013 | Herbst |

(56) References Cited

U.S. PATENT DOCUMENTS

| | | |
|---|---|---|
| 2013/0186473 A1 | 7/2013 | Mankame et al. |
| 2013/0186807 A1 | 7/2013 | Browne et al. |
| 2013/0187538 A1 | 7/2013 | Herbst |
| 2013/0192860 A1 | 8/2013 | Puzio et al. |
| 2013/0207758 A1 | 8/2013 | Browne et al. |
| 2013/0252375 A1 | 9/2013 | Yi et al. |
| 2013/0256274 A1 | 10/2013 | Faulkner |
| 2013/0279060 A1 | 10/2013 | Nehl |
| 2013/0305705 A1 | 11/2013 | AC et al. |
| 2013/0341137 A1 | 12/2013 | Mandame et al. |
| 2014/0001745 A1 | 1/2014 | Lehmann et al. |
| 2014/0044972 A1 | 2/2014 | Menassa et al. |
| 2014/0072261 A1 | 3/2014 | Isenhour et al. |
| 2014/0152252 A1 | 6/2014 | Wood et al. |
| 2014/0205235 A1 | 7/2014 | Benjamin et al. |
| 2014/0221741 A1 | 8/2014 | Wang et al. |
| 2015/0253908 A1 | 9/2015 | Go |

FOREIGN PATENT DOCUMENTS

| | | |
|---|---|---|
| EP | 0 345 554 A1 | 12/1989 |
| EP | 0 545 737 A1 | 6/1993 |
| FR | 823395 | 1/1938 |
| GB | 1 495 677 A | 12/1977 |
| JP | 60-091011 U | 5/1985 |
| WO | WO-02/31945 A2 | 4/2002 |
| WO | WO-2007/081830 A2 | 7/2007 |
| WO | WO-2009/124030 A1 | 10/2009 |
| WO | WO-2010/141324 A1 | 12/2010 |

OTHER PUBLICATIONS

Adam Flaherty "Make: Magnetic Appcessories with Andrea Bianchi" posted Oct. 29, 2012, http://makenzine.com/2012/10/29/magnetic-appcessories-with-andrea-bianchi (downloaded Dec. 9, 2013).

Jason Desbonnet "Random Tech Stuff: Arduino to Android IO on the cheap (aka Poor Man's NFC" May 1, 2011, http://jbesbonnet.blogspot.com/2011_05_01_archive.html (downloaded Dec. 9, 2013).

Series BNS, Compatible Series AES Safety Controllers, http://www.schmersalusa.com/safety_controllers/drawings/aes.pdf, pp. 159-175, date unknown.

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog_pdfs/BNS_B20.pdf, 2 pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

Wikipedia, "Barker Code", Web article, last modified Aug. 2, 2008, 2 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Golomb Ruler", Web article, last modified Nov. 4, 2008, 3 pages.

Wikipedia, "Costas Array", Web article, last modified Oct. 7, 2008, 4 pages.

Wikipedia, "Walsh Code", Web article, last modified Sep. 17, 2008, 2 pages.

Wikipedia, "Gold Code", Web article, last modified Jul. 27, 2008, 1 page.

Wikipedia, "Bitter Electromagnet", Web article, last modified Aug. 2011, 1 page.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Mar. 12, 2012, issued in counterpart U.S. Appl. No. 12/206,270.

United States Office Action, dated Feb. 22, 2011, issued in counterpart U.S. Appl. No. 12/476,952.

United States Office Action, dated Oct. 12, 2011, issued in counterpart U.S. Appl. No. 12/476,952.

United States Office Action, dated Mar. 9, 2012, issued in counterpart U.S. Appl. No. 13/371,280.

International Search Report and Written Opinion, dated May 14, 2009, issued in related International Application No. PCT/US2009/038925.

International Search Report and Written Opinion, dated Jul. 13, 2010, issued in related International Application No. PCT/US2010/021612.

International Search Report and Written Opinion dated Jun. 1, 2009, issued in related International Application No. PCT/US2009/002027.

International Search Report and Written Opinion, dated Aug. 18, 2010, issued in related International Application No. PCT/US2010/036443.

International Search Report and Written Opinion, dated Apr. 8, 2011 issued in related International Application No. PCT/US2010/049410.

Atallah, K., Calverley, S.D., D. Howe, 2004, "Design, analysis and realisation of a high-performance magnetic gear", IEE Proc.-Electr. Power Appl., vol. 151, No. 2, Mar. 2004.

Atallah, K., Howe, D. 2001, "A Novel High-Performance Magnetic Gear", IEEE Transactions on Magnetics, vol. 37, No. 4, Jul. 2001, p. 2844-46.

Bassani, R., 2007, "Dynamic Stability of Passive Magnetic Bearings", Nonlinear Dynamics, V. 50, p. 161-68.

Boston Gear 221S-4, One-stage Helical Gearbox, http://www.bostongear.com/pdf/product_sections/200_series_helical.pdf, referenced Jun. 2010.

Charpentier et al., 2001, "Mechanical Behavior of Axially Magnetized Permanent-Magnet Gears", IEEE Transactions on Magnetics, vol. 37, No. 3, May 2001, p. 1110-17.

Chau et al., 2008, "Transient Analysis of Coaxial Magnetic Gears Using Finite Element Comodeling", Journal of Applied Physics, vol. 103.

Choi et al., 2010, "Optimization of Magnetization Directions in a 3-D Magnetic Structure", IEEE Transactions on Magnetics, vol. 46, No. 6, Jun. 2010, p. 1603-06.

Correlated Magnetics Research, 2009, Online Video, "Innovative Magnetics Research in Huntsville", http://www.youtube.com/watch?v=m4m81JjZCJo.

Correlated Magnetics Research, 2009, Online Video, "Non-Contact Attachment Utilizing Permanent Magnets", http://www.youtube.com/watch?v=3xUm25CNNgQ.

Correlated Magnetics Research, 2010, Company Website, http://www.correlatedmagnetics.com.

Furlani 1996, "Analysis and optimization of synchronous magnetic couplings", J. Appl. Phys., vol. 79, No. 8, p. 4692.

Furlani 2001, "Permanent Magnet and Electromechanical Devices", Academic Press, San Diego.

Furlani, E.P., 2000, "Analytical analysis of magnetically coupled multipole cylinders", J. Phys. D: Appl. Phys., vol. 33, No. 1, p. 28-33.

General Electric DP 2.7 Wind Turbine Gearbox, http://www.gedrivetrain.com/insideDP27.cfm, referenced Jun. 2010.

Ha et al., 2002, "Design and Characteristic Analysis of Non-Contact Magnet Gear for Conveyor by Using Permanent Magnet", Conf. Record of the 2002 IEEE Industry Applications Conference, p. 1922-27.

Huang et al., 2008, "Development of a Magnetic Planetary Gearbox", IEEE Transactions on Magnetics, vol. 44, No. 3, p. 403-12.

International Search Report and Written Opinion of the International Searching Authority issued in Application No. PCT/US12/61938 dated Feb. 26, 2013.

International Search Report and Written Opinion of the International Searching Authority issued in Application No. PCT/US2013/028095 dated May 13, 2013.

(56) References Cited

OTHER PUBLICATIONS

Jian et al., "Comparison of Coaxial Magnetic Gears With Different Topologies", IEEE Transactions on Magnetics, vol. 45, No. 10, Oct. 2009, p. 4526-29.

Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.

Jørgensen et al., "The Cycloid Permanent Magnetic Gear", IEEE Transactions on Industry Applications, vol. 44, No. 6, Nov./Dec. 2008, p. 1659-65.

Jørgensen et al., 2005, "Two dimensional model of a permanent magnet spur gear", Conf. Record of the 2005 IEEE Industry Applications Conference, p. 261-5.

Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.

Krasil'nikov et al., 2009, "Torque Determination for a Cylindrical Magnetic Clutch", Russian Engineering Research, vol. 29, No. 6, pp. 544-547.

Liu et al., 2009, "Design and Analysis of Interior-magnet Outer-rotor Concentric Magnetic Gears", Journal of Applied Physics, vol. 105.

Lorimer, W., Hartman, A., 1997, "Magnetization Pattern for Increased Coupling in Magnetic Clutches", IEEE Transactions on Magnetics, vol. 33, No. 5, Sep. 1997.

Mezani, S., Atallah, K., Howe, D. , 2006, "A high-performance axial-field magnetic gear", Journal of Applied Physics vol. 99.

Mi, "Magnetreater/Charger Model 580" Magnetic Instruments Inc. Product specification, May 4, 2009, http://web.archive.org/web/20090504064511/http://www.maginst.com/specifications/580_magnetreater.htm, 2 pages.

Neugart PLE-160, One-Stage Planetary Gearbox, http://www.neugartusa.com/ple_160_gb.pdf, referenced Jun. 2010.

Notice of Allowance issued in U.S. Appl. No. 13/471,189 dated Apr. 3, 2013.

Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.

United States Office Action issued in U.S. Appl. No. 13/104,393 dated Apr. 4, 2013.

United States Office Action issued in U.S. Appl. No. 13/236,413 dated Jun. 6, 2013.

United States Office Action issued in U.S. Appl. No. 13/374,074 dated Feb. 21, 2013.

United States Office Action issued in U.S. Appl. No. 13/470,994 dated Jan. 7, 2013.

United States Office Action issued in U.S. Appl. No. 13/529,520 dated Sep. 28, 2012.

United States Office Action issued in U.S. Appl. No. 13/530,893 dated Mar. 22, 2013.

United States Office Action issued in U.S. Appl. No. 13/855,519 dated Jul. 17, 2013.

United States Office Action issued in U.S. Appl. No. 13/470,994 dated Aug. 8, 2013.

United States Office Action issued in U.S. Appl. No. 13/430,219 dated Aug. 13, 2013.

C. Pompermaier, L. Sjoberg, and G. Nord, Design and Optimization of a Permanent Magnet Transverse Flux Machine, XXth International Conference on Electrical Machines, Sep. 2012, p. 606, IEEE Catalog No. CFP1290B-PRT, ISBN: 978-1-4673-0143-5.

V. Rudnev, An Objective Assessment of Magnetic Flux Concentrators, Heat Treating Progress, Nov./Dec. 2004, p. 19-23.

* cited by examiner

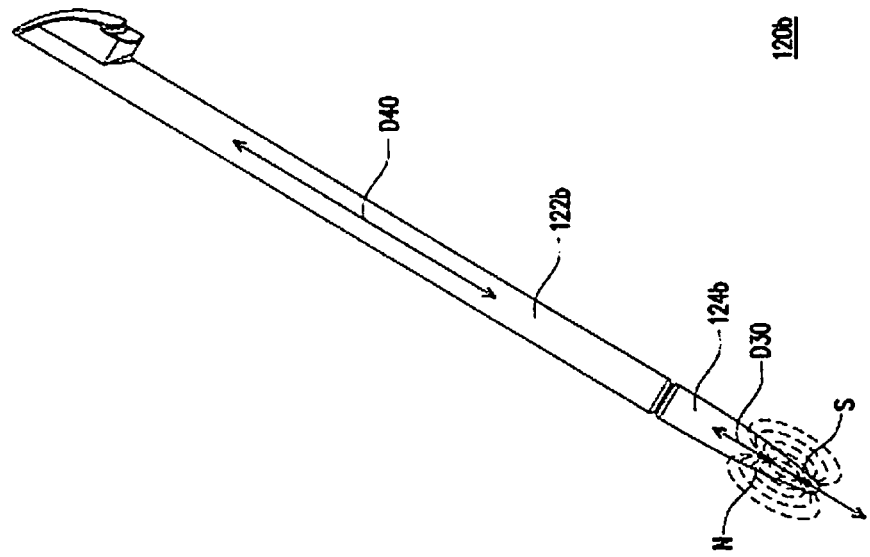
(FIG. 2B Prior Art)
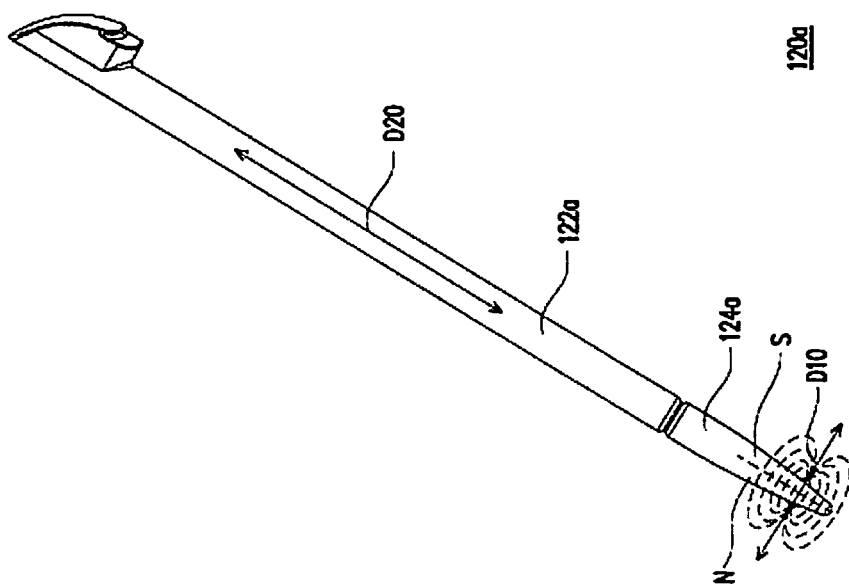
FIG. 2A (Prior Art)

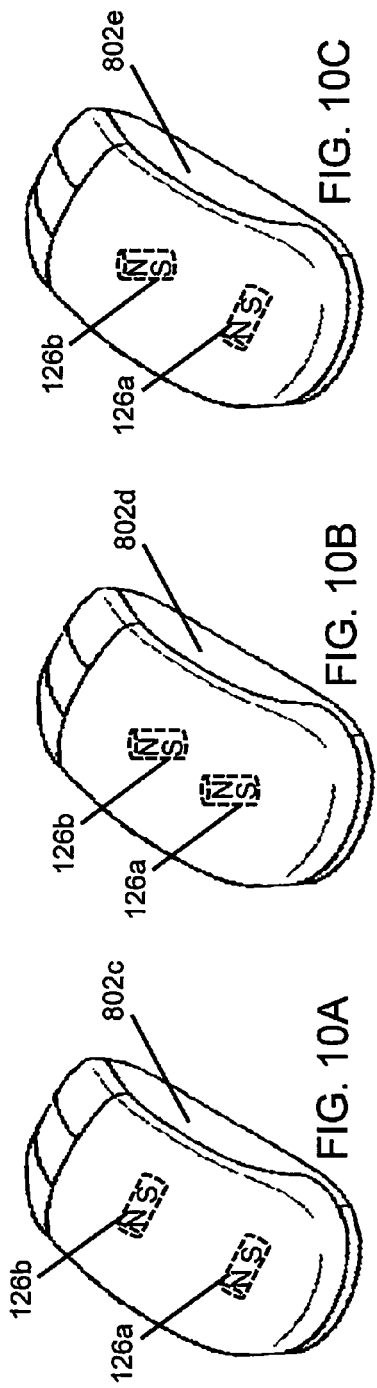

MAGNETIC VECTOR SENSOR POSITIONING AND COMMUNICATIONS SYSTEM

CLAIM OF PRIORITY

This application claims the benefit U.S. Provisional Application Ser. No. 61/746,456 filed on Dec. 27, 2012. The contents of this document are incorporated by reference herein.

FIELD OF THE INVENTION

The present invention relates generally to a magnetic vector sensor positioning and communications system. More particularly, the present invention relates to a system for monitoring the movement of one or more magnets located external to a device using the vector data from one or more magnetic vector sensors incorporated in the device to determine a position and/or to communicate information.

BACKGROUND OF THE INVENTION

Touchscreens

A touchscreen is an electronic visual display that can detect the presence and location of a touch within the display area. The term generally refers to touching the display of the device with a finger or hand. Touchscreens can also sense other passive objects, such as a stylus. Touchscreens are common in devices such as game consoles, all-in-one computers, tablet computers, and smartphones.

The touchscreen has two main attributes. First, the touchscreen enables one to interact directly with what is displayed, rather than indirectly with a pointer controlled by a mouse or touchpad. Secondly, the touchscreen lets one do so without requiring any intermediate device that would need to be held in the hand (other than a stylus, which is optional for most modern touchscreens). Such displays can be attached to computers, or to networks as terminals. They also play a prominent role in the design of digital appliances such as the personal digital assistant (PDA), satellite navigation devices, mobile phones, and video games.
Source: http://en.wikipedia.org/wiki/Touchscreen
Capacitive Touchscreens A capacitive touchscreen panel consists of an insulator such as glass, coated with a transparent conductor such as indium tin oxide (ITO). As the human body is also an electrical conductor, touching the surface of the screen results in a distortion of the screen's electrostatic field, measurable as a change in capacitance. Different technologies may be used to determine the location of the touch (e.g., see capacitive sensing touchscreen technology discussed below). The location is then sent to the controller for processing. However, one cannot use a capacitive touchscreen through most types of electrically insulating material, such as gloves, instead one requires a special capacitive stylus, or a special-application glove with an embroidered patch of conductive thread passing through it and contacting the user's fingertip. This disadvantage especially affects usability in consumer electronics, such as touch tablet PCs and capacitive smartphones in cold weather.
Source: http://en.wikipedia.org/wiki/Touchscreen
Resistive Touchscreens Resistive touchscreens are touch-sensitive computer displays composed of two flexible sheets coated with a resistive material and separated by an air gap or microdots. There are two different types of metallic layers. The first type is called Matrix, in which striped electrodes on substrates such as glass or plastic face each other. The second type is called Analogue which consists of transparent electrodes without any patterning facing each other. As of 2011, Analogue offered lowered production costs when compared to Matrix. In Analogue, when contact is made to the surface of the touchscreen, the two sheets are pressed together. On these two sheets there are horizontal and vertical lines that, when pushed together, register the precise location of the touch. Because the touchscreen senses input from contact with nearly any object (finger, stylus/pen, palm) resistive touchscreens are a type of "passive" technology.

For example, during operation of a four-wire touchscreen, a uniform, unidirectional voltage gradient is applied to the first sheet. When the two sheets are pressed together, the second sheet measures the voltage as distance along the first sheet, providing the X coordinate. When this contact coordinate has been acquired, the uniform voltage gradient is applied to the second sheet to ascertain the Y coordinate. These operations occur within a few milliseconds, registering the exact touch location as contact is made.

Resistive touchscreens typically have high resolution (4096×4096 DPI or higher), providing accurate touch control. Because the touchscreen responds to pressure on its surface, contact can be made with a finger or any other pointing device.

Resistive touchscreen technology works well with almost any stylus-like object, and can also be operated with gloved fingers and bare fingers alike. In some circumstances, this is more desirable than a capacitive touchscreen, which has to be operated with a capacitive pointer, such as a bare finger (latest capacitive technology enables gloves on touchscreens). The resistive touchscreen costs are relatively low when compared with active touchscreen technologies. Resistive touchscreen technology can be made to support multi-touch input.

For people who must grip the active portion of the screen or must set their entire hand down on the screen, alternative touchscreen technologies are available, such as an active touchscreen in which only the stylus creates input and skin touches are rejected. However, newer touchscreen technologies allow the use of multi-touch without the aforementioned vectoring issues.
Source: http://en.wikipedia.org/wiki/Resistive_touchscreen
Capacitive Sensing Touchscreen Technology
Source: http://en.wikipedia.org/wiki/Resistive_touchscreen Capacitive sensing is a technology based on capacitive coupling that is used in many different types of sensors, including those to detect and measure proximity, position or displacement, humidity, fluid level, and acceleration. Capacitive sensing as a human interface device (HID) technology, for example to replace the computer mouse, is growing increasingly popular. Capacitive touch sensors are used in many devices such as laptop trackpads, digital audio players, computer displays, mobile phones, mobile devices, tablets and others. More and more design engineers are selecting capacitive sensors for their versatility, reliability and robustness, unique human-device interface and cost reduction over mechanical switches.

Capacitive sensors detect anything that is conductive or has a dielectric different than that of air. While capacitive sensing applications can replace mechanical buttons with capacitive alternatives, other technologies such as multi-touch and gesture-based touchscreens are also premised on capacitive sensing.

Capacitive sensing touchscreens do not respond to a traditional stylus and instead require a capacitive stylus, which is unable to provide high resolution positional input. A typical capacitive stylus has a conductive tip shaped similar to a fingertip, which is made out of capacitive foam. Another capacitive stylus resembles a ball point pen but has a flat round plastic disk attached to the point of the pen. Still another capacitive stylus has a stainless steel ring that has a vinyl film on the surface that makes contact with a touchscreen. Yet another type of capacitive stylus includes a magnet in the head of the stylus enabling a capacitive sensing touchscreen to detect that it has been touched by the stylus. This stylus is described in U.S. Patent Application No. 2009/0167727, filed Dec. 16, 2008, and entitled "Stylus and Electronic Device", the contents of which are incorporated herein by reference. FIGS. 1A, 1B, 2A, and 2B (PRIOR ART) are provided from this patent application. FIGS. 1A and 1B depict an electronic device 100 having a device body 110 and a stylus 120. The device body 110 has a capacitive touch panel 112. The stylus 120 has a handle 122 and a head 124. The head 124 is magnetic. The head 124 may be made of a magnetic material or may be provided with a magnet 126 at a tip of the head 124. When a relative speed exists between the head 124 of the stylus 120 and any region of the touch panel 112, an inducing current is generated on the region of the panel 112 due to magnetic force lines M10 of the head 124. FIGS. 2A and 2B (PRIOR ART) depict two distribution modes of magnetic poles of a stylus 120a and 120b. Referring to FIG. 2A, a connection line D10 between magnetic poles N and S of a head 124a of a stylus 120a is substantially perpendicular to a lengthwise direction D20 of a handle 122a. Alternatively, referring to FIG. 2B, a connecting line D 30 between magnetic poles N and S of a head 124b of a stylus 120b is substantially parallel to a lengthwise direction D40 of a handle 122b.

Many devices having capacitive touchscreen interfaces also include at least one vector magnetics sensor (or vector magnetometer) used to determine the orientation of the device or a portion of the device (e.g., a hinged display that can move from an open position to a closed position). More specifically, the at least one magnetics sensor is used to sense (or measure) the magnetic field produced by the Earth and provides one-dimensional, two dimensional, or three-dimensional orientation information in the form of X, Y, and/or Z vector data that can be processed by software typically resident on the device (but which can be remote) to determine how the device is being moved about by the user. Such vector magnetics sensor data (or information) enables applications such as games where the device (e.g., a cell phone) itself can be used as a game controller. Magnetic sensor information can also be used to determine the state of a device's display (e.g., open, closed, nearly closed, etc.), such as is the case with Apple® laptop computers, where the position of the display relative to the keyboard is used to change the state of the machine (e.g., on, sleep, off). Similarly, the cover of the Apple iPad® includes a magnet that is detectable by a magnetic field sensor, which is used for determining whether or not the cover is covering the display. FIG. 3A (PRIOR ART) depicts an exemplary hall sensor array 302 used in a smartphone. FIG. 3B (PRIOR ART) depicts an exemplary cell phone 303 having an exemplary X axis 304, Y axis 306, and Z axis 308. FIG. 3C (PRIOR ART) depicts an exemplary output display showing vector data 310, 312, 314 corresponding to the X, Y, and Z vectors (i.e., magnitude and direction of the X, Y, and Z magnetic field components) as an electronic device such as the cell phone 303 is moved about over a period of time.

Magnets external to a device have been used to interact with an electronic device having a magnetometer. U.S. Patent Application No. 2011/0190060, filed Jan. 31, 2011, and entitled "Around Device Interaction for Controlling and Electronic Device, for Controlling a Computer Game and for User Verification", the contents of which are incorporated herein by reference, describes use of a magnetometer within an electronic device to measure changes in magnetic strengths resulting from the relative motion of an external magnet in order to identify (or recognize) gesture induced movements. The tracking of the relative movement of a magnet is described as being coarse and magnetic field amplitude based, where polarity is only used to identify one magnet vs. another. The relative motion is only discerned and is not absolute position-based. Generally, gestures can be recognized regardless of where a given motion actually occurs or originates relative to the device. However, because the gestures are position indeterminate the ability to provide high resolution precision input as required for absolute position-based functions such as precision drawing or lettering is not enabled. Instead the coarse movement of the magnet only enables recognition of gestures such as moving a hand downward, swiping left or right, rotating, zooming, etc. Examples of the magnet gesturing systems are provided in FIGS. 4A and 4B (PRIOR ART). FIG. 4A depicts a controlling apparatus 401 comprising a mobile phone 402 and a magnetic ring 403. The mobile phone 402 is held by the left hand 442 and the magnetic ring 403 is on the index finger of the right hand 441. The mobile phone 402 has a touchscreen 421 and a standard magnetic sensor (not shown) that is located inside the mobile phone 402. The mobile phone 402 executes a computer program 422 that implements the controlling means on the phone 402. FIG. 4B depicts a controlling apparatus 410 comprising a stick 430 as the magnetic element.

U.S. Patent Application No. 2012/0084051, filed May 21, 2010, and entitled "Method and Arrangement for Magnetically Determining a Position", the contents of which are herein incorporated herein by reference, describes magnetically determining a position of a permanent magnet located above a magnetic sensor array, where the vector and local gradient of the magnetic flux density of the a spherical homogenously magnetized magnet is measured using a position sensor. The position and orientation of the magnetic dipole of the permanent magnet relative to the position sensor is calculated from the measured values. A spherical permanent magnet having homogenous magnetization is used to prevent previously present cross-sensitivity between the position and orientation determination, and allowing measurement without prior calibration. FIG. 5 (PRIOR ART) depicts the magnetic field B of a magnetic sphere 501 being tracked by a position sensor 502 comprising an array of Hall Effect sensors 503.

Examples of use of a magnetometer for communicating with an electronic device and determining a position can also be found in a story available on an online blog at http://blog.makezine.com/2012/10/29/magnetic-appcessories-with-andrea-bianchi/, which is incorporated by reference herein in its entirety.

A web log by Joe DesBonnet found at http://jdesbonnet.blogspot.com/2011_05_01_archive.html (the contents of which are incorporated by reference herein) describes a cheap and simple one-way communications link from an Arduino microcontroller to an Android cellphone, where he uses a digital IO line of the Arduino to drive a coil of wire placed over the magnetometer of the Android. He employs a Non Return to Zero encoding scheme, where he monitors the output of one axis (Z) of the magnetometer using the Android 'Tricorder' application. He successfully communicated "Hello World!" at approximately 7 bps and suggested potential improvements to increase his data rate including using a DAC, using four power levels to encode 2 bits per symbol and using forward error correction. He also mentions that it might be possible to construct a set of coils that excite the X, Y, and Z channels independently to triple his data rate. He further mentions some applications might only require an analog signal. FIG. 6 (PRIOR ART) depicts the communications link 600 from the Arduino 602 to the Android 604 via the use of a coil 606 placed over the magnetometer (not shown) of the Android 604.

SUMMARY

A system, a first device and various methods are described in the independent claims of the present application. Advantageous embodiments of the system, the first device, and the various methods have been described in the dependent claims of the present application.

In one aspect, the present invention provides a system comprising: (1) a first device comprising a screen and at least one vector magnetic sensor; (2) a second device comprising a magnet; (3) the first device utilizes the at least one vector magnetic sensor which interfaces with the magnet in the second device to obtain vector data which corresponds to an absolute orientation and location of the second device within a coordinate system based on an absolute orientation and location of the first device; and (4) the first device utilizes the vector data to map the location of the second device to a location on the screen.

In another aspect, the present invention provides a first device (and a method implemented by the same) which interfaces with a second device that has a magnet. The first device comprises: (1) a screen; (2) at least one vector magnetic sensor; (3) a processor; and (4) a memory that stores processor-executable instructions where the processor interfaces with the memory and executes the processor-executable instructions to enable the following operations: (a) interface with second device which comprises a magnet; (b) obtain vector data which corresponds to an absolute orientation and location of the second device within a coordinate system based on an absolute orientation and location of the first device; and (c) utilize the vector data to map the location of the second device to a location on the screen.

In yet another aspect, the present invention provides a first device (and a method implemented by the same) which interfaces with a second device which has a plurality of magnets. The first device comprises: (1) at least one vector magnetic sensor; (2) a processor; and (3) a memory that stores processor-executable instructions where the processor interfaces with the memory and executes the processor-executable instructions to enable the following operations: (a) determine a position within an environment by interacting with the second device which comprises a plurality of magnets with magnetic fields which are modulated to function as an identifier or provide coordinates of a reference location within an established coordinate system.

In still another aspect, the present invention provides a first device (and a method implemented by the same) which interfaces with a second device associated with a security door and a server. The first device comprises: (1) a screen; (2) at least one vector magnetic sensor; (3) a processor; and (4) a memory that stores processor-executable instructions where the processor interfaces with the memory and executes the processor-executable instructions to enable the following operations: (a) interact with the second device which comprises a plurality of magnets with magnetic fields which are modulated to function as an identifier of the security door; (b) send, to the server, the identifier of the security door along with an identifier of the first device, wherein the server sends a validation code to the security door which the security device uses to produce a validation emission; (c) receive, from the security door, the validation emission; and (d) send, to the server, the validation emission.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIG. 2A (PRIOR ART) depicts a magnetic stylus as illustrated in U.S. Patent Application No. 2009/0167727;

FIG. 2B (PRIOR ART) depicts another magnetic stylus as illustrated in U.S. Patent Application No. 2009/0167727;

FIG. 10A depicts a second device in the form of a mouse having two magnets where each of the two magnets has a first orientation relative to a surface in accordance with an embodiment of the present invention;

FIG. 10B depicts a second device in the form of a mouse having two magnets where each of the two magnets has a second orientation relative to a surface in accordance with an embodiment of the present invention;

FIG. 10C depicts a second device in the form of a mouse having two magnets where one of the magnets has a first orientation relative to a surface and the other one of the magnets has a second orientation relative to a surface in accordance with an embodiment of the present invention;

FIG. 10D depicts a second device in the form of a joy stick input device comprising a base (with one magnet) and control handle (with one magnet) in accordance with an embodiment of the present invention;

FIG. 10E depicts a second device in the form of a joy stick input device comprising a base (with one magnet) and control handle (with two magnets) in accordance with an embodiment of the present invention;

FIG. 10F depicts a second device in the form of a joy stick input device comprising a base (with one magnet) and control handle (with three magnets) in accordance with an embodiment of the present invention.

DETAILED DESCRIPTION OF THE INVENTION

In accordance with one aspect of the invention, vector magnetic sensor-based orientation sensing capabilities of a first device are leveraged to determine the orientation of one or more second devices that may be associated with the first device, where the first device comprises at least one vector magnetics sensor and each of the one or more second devices comprises at least one magnet, where the at least one magnet may be a permanent magnet, an electromagnet, or a electropermanent magnet. Specifically, a second device may comprise a stylus, a joystick, a game controller, a mouse, a glove, a keyboard, an eyepiece, a laptop, a trackpad, a digital audio player, a computer display, a mobile phone, a mobile device, a tablet, etc. Moreover, the second device could merely be a magnet.

Figure 1B:
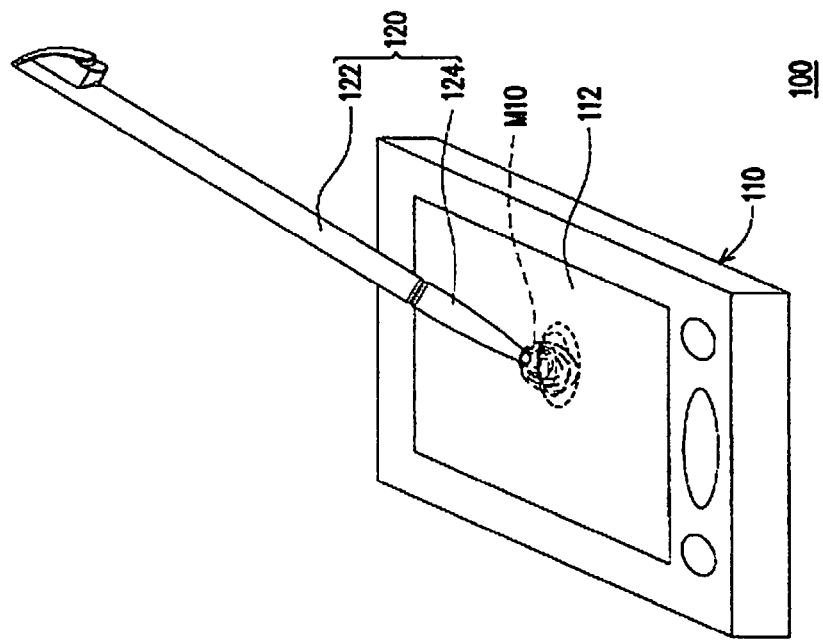
FIG. 1B (PRIOR ART) depicts an electronic device having a device body and a stylus as illustrated in U.S. Patent Application No. 2009/0167727.
Figure 1A:
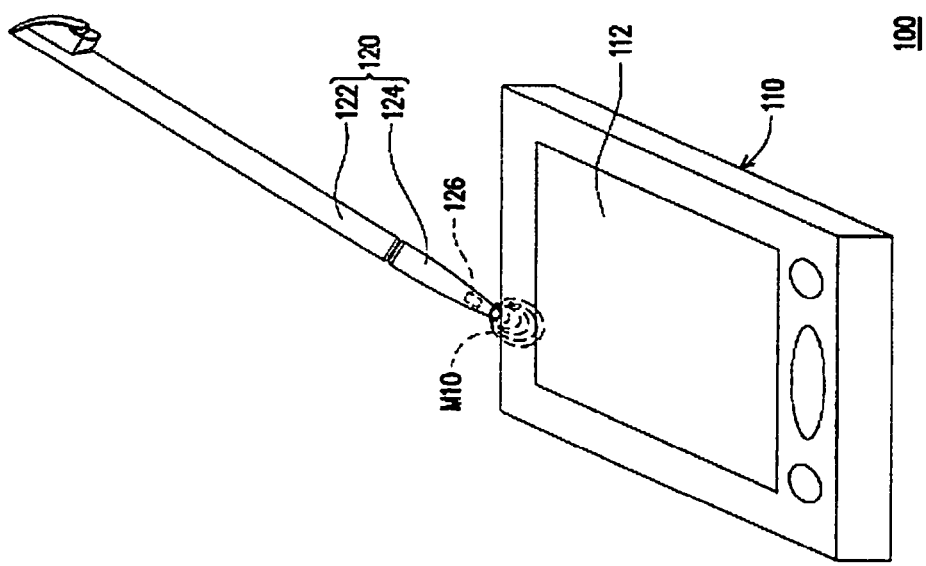
FIG. 1A (PRIOR ART) depicts an electronic device having a device body and a stylus as illustrated in U.S. Patent Application No. 2009/0167727.
Figure 3C:
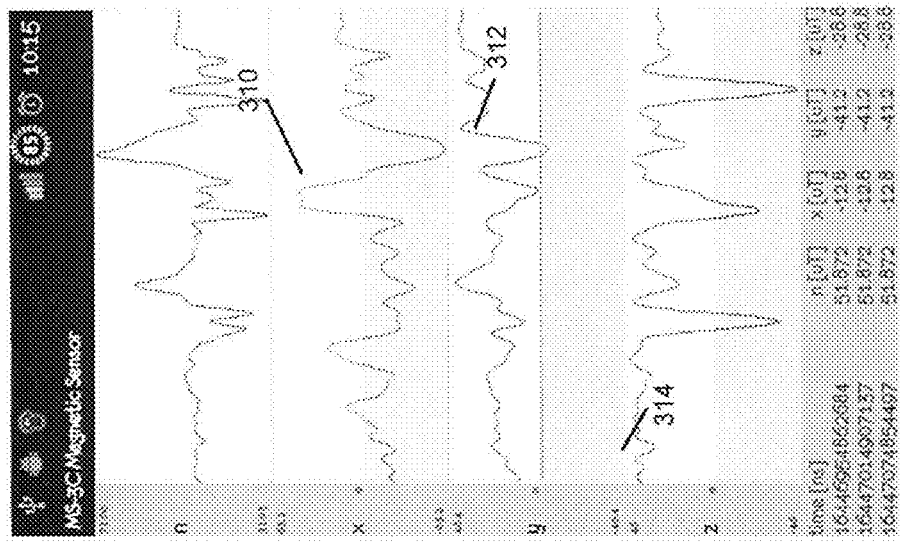
FIG. 3C (PRIOR ART) depicts an exemplary output display showing vector data corresponding to the X, Y, and Z vectors (i.e., magnitude and direction of the X, Y, and Z magnetic field components) as an electronic device such as the cell phone shown in FIG. 3B is moved about over a period of time.
Figure 3A:
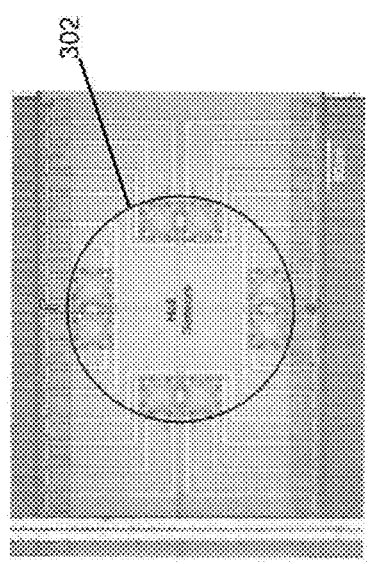
FIG. 3A (PRIOR ART) depicts an exemplary hall sensor array used in a smartphone.
Figure 3B:
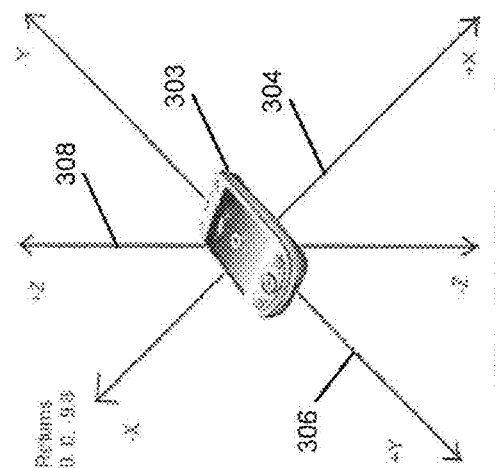
FIG. 3B (PRIOR ART) depicts an exemplary cell phone having an exemplary X axis, Y axis, and Z axis.
Figures 4A, 4B:
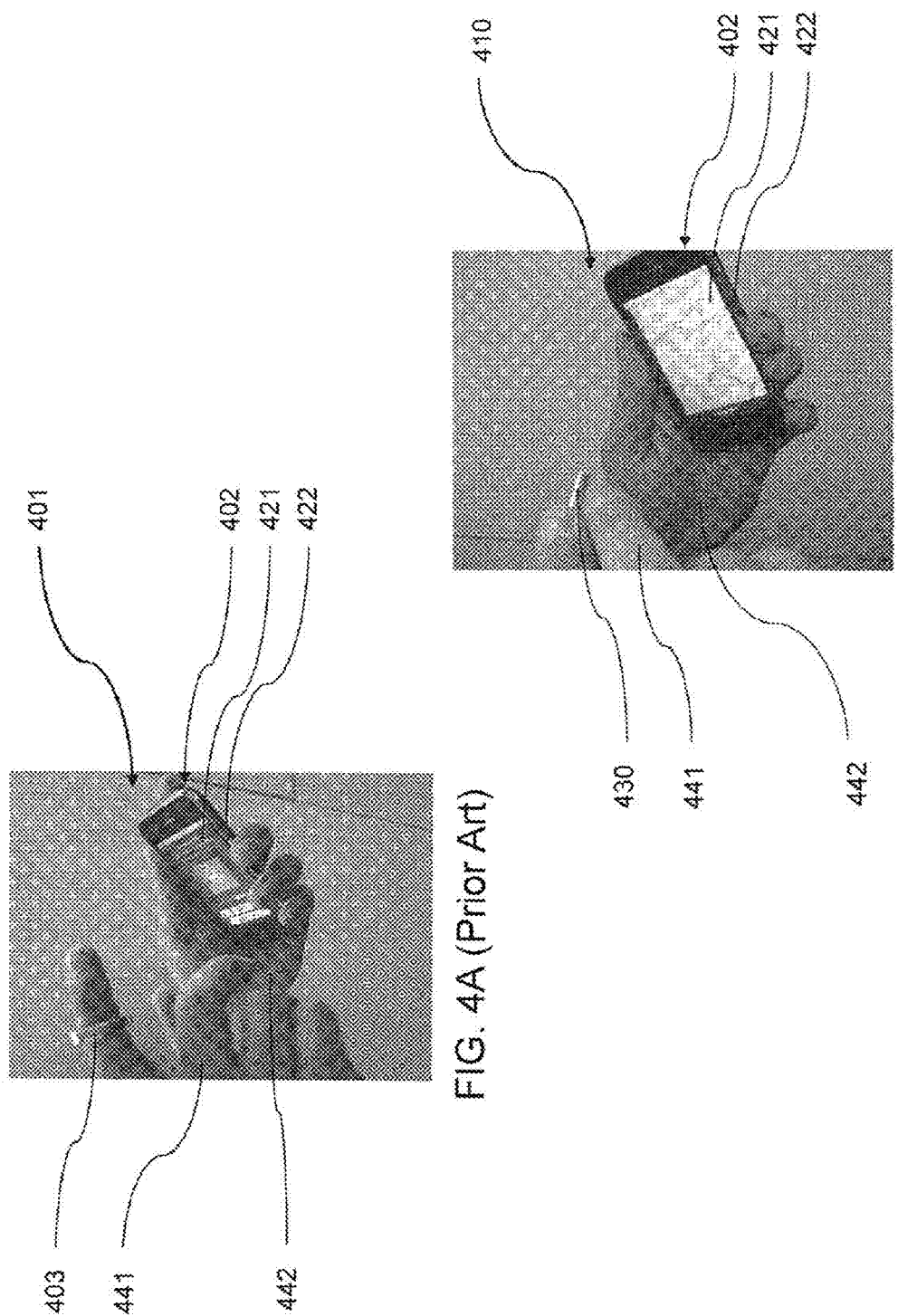
FIG. 4A (PRIOR ART) depicts an example of a magnet gesturing system.
FIG. 4B (PRIOR ART) depicts another example of a magnet gesturing system.
Figure 5:
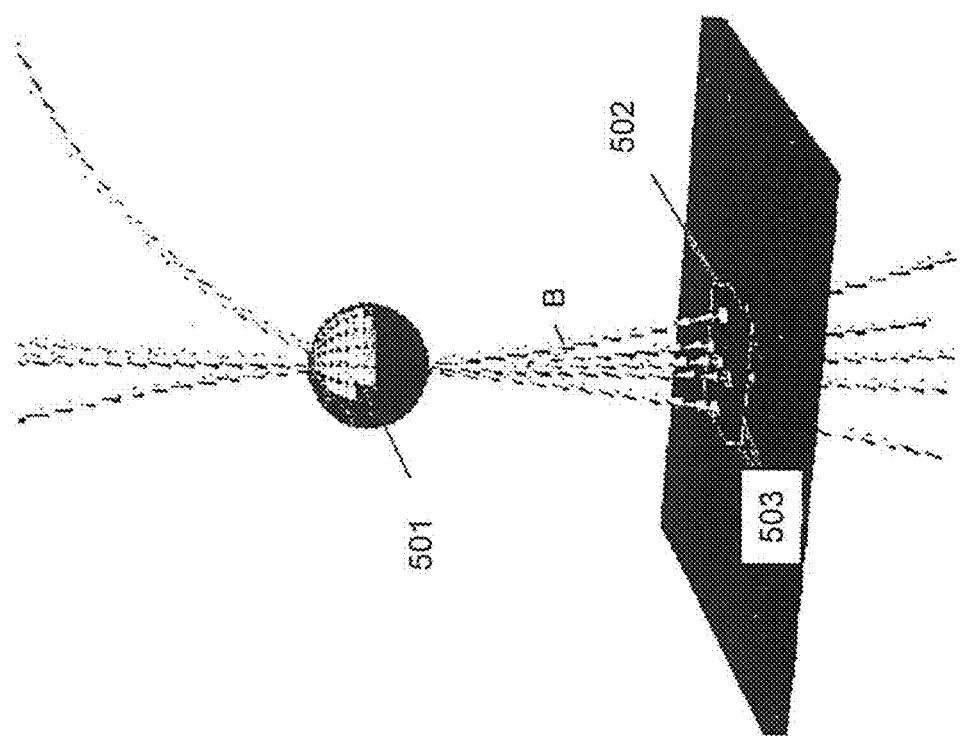
FIG. 5 (PRIOR ART) depicts the magnetic field B of a magnetic sphere being tracked by a position sensor comprising an array of Hall Effect sensors.
Figure 6:
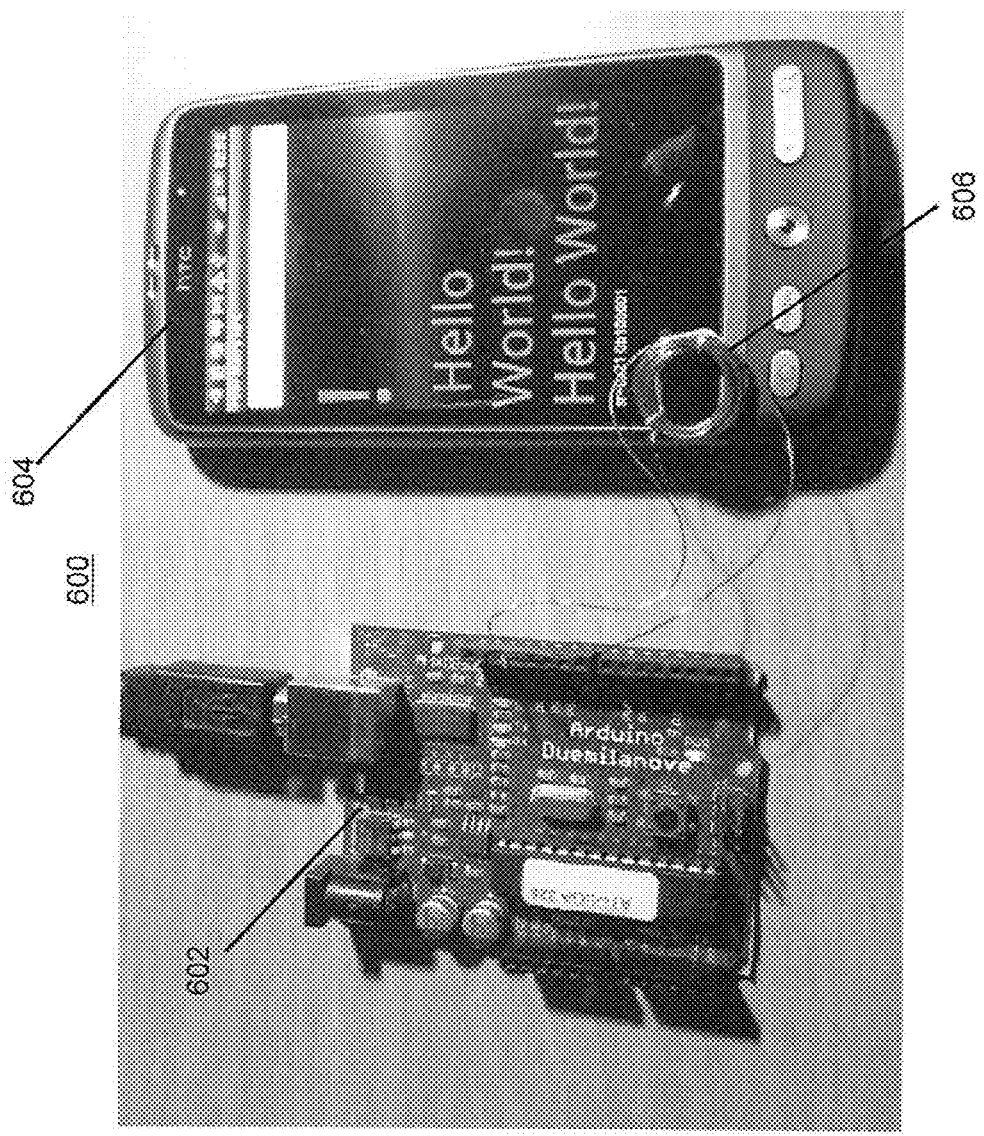
FIG. 6 (PRIOR ART) depicts the communications link from an Arduino to an Android via the use of a coil placed over the magnetometer of the Android.
Figure 7A:
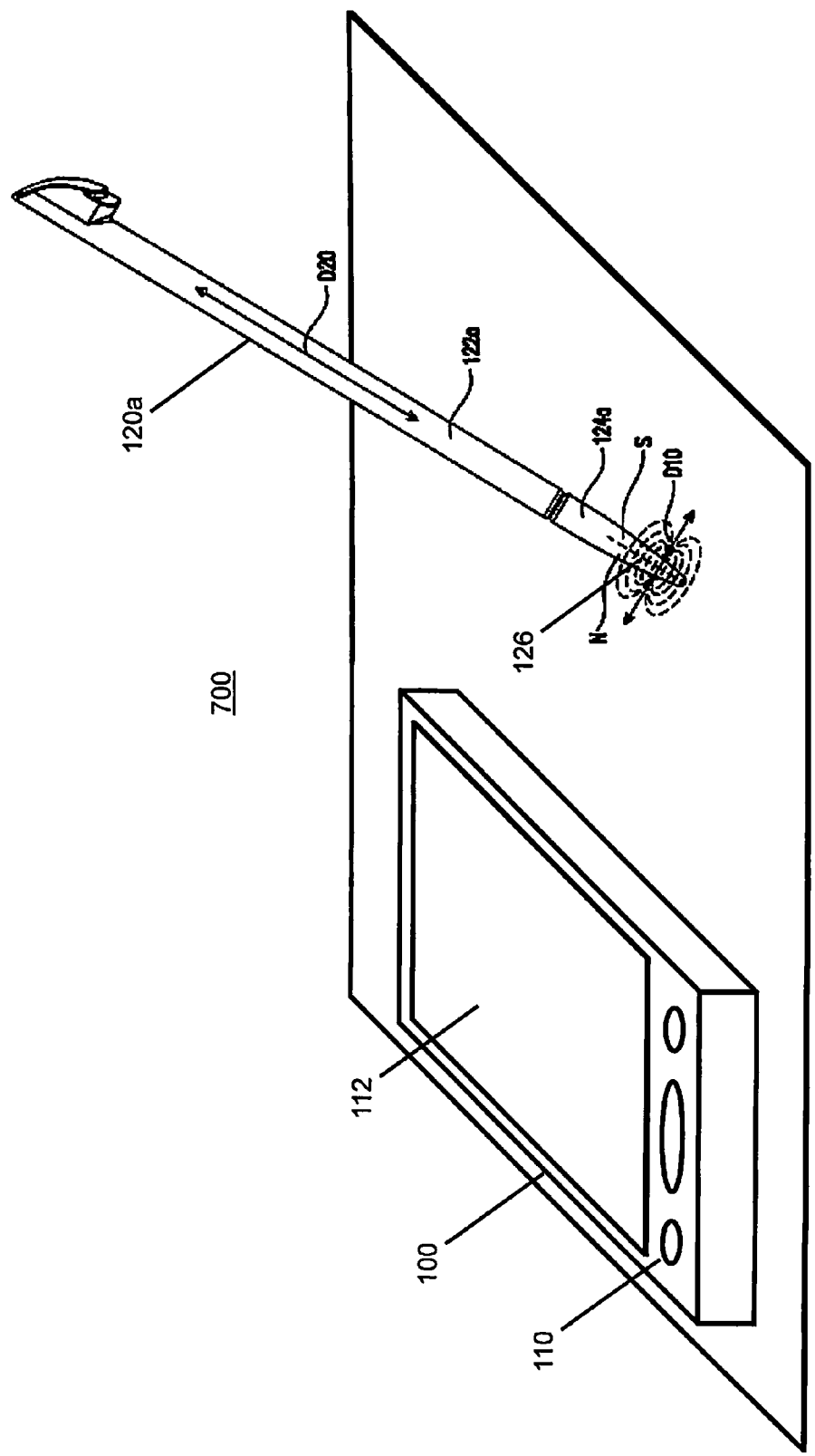
FIG. 7A depicts a system comprising a first device (e.g., a mobile phone) which has a touchscreen (e.g., a capacitive touchscreen) and a second device, e.g., a stylus, which has a magnet such as the stylus shown in FIG. 2A in accordance with an embodiment of the present invention.
Figure 7B:
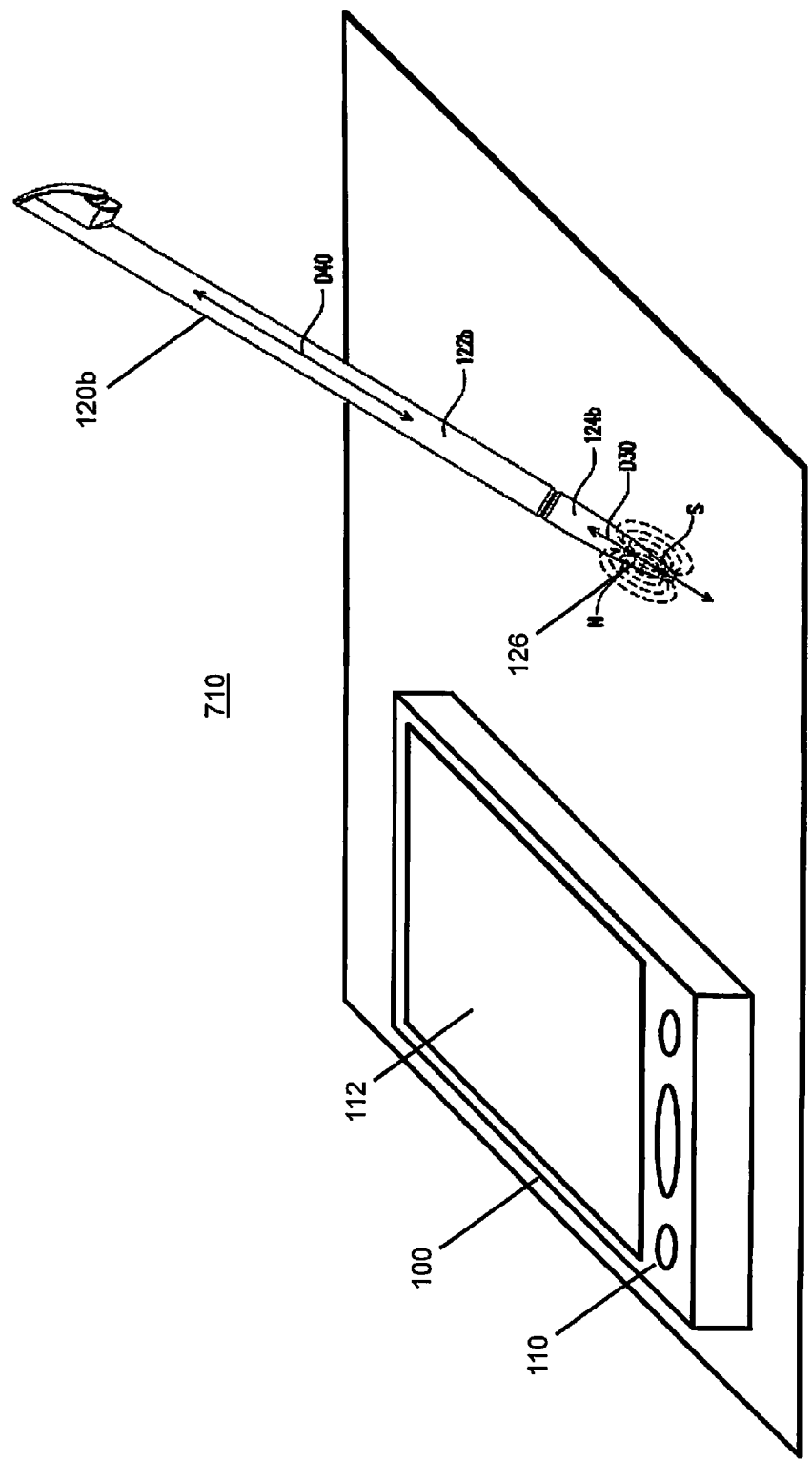
FIG. 7B depicts a system comprising a first device (e.g., a mobile phone) which has a touchscreen (e.g., a capacitive touchscreen) and a second device, e.g., a stylus, which has a magnet such as the stylus shown in FIG. 2B in accordance with an embodiment of the present invention.

In accordance with a first embodiment of the invention depicted in FIG. 7A, a system 700 may comprise a first device 100 (e.g., a mobile phone 100) comprising a touchscreen 112 (e.g., a capacitive touchscreen 112) and a second device, e.g., a stylus 120a, comprising a magnet 126 such as the stylus 120a shown in FIG. 2A. Unlike the prior art approach described previously in relation to FIG. 1A where the stylus 120 was touched to a capacitive touchscreen 112 such that magnetic field lines of a magnet 126 in the head of the stylus 120 produced a capacitive response, a stylus 120a (or any other second device in accordance with the invention) comprising a magnet 126 doesn't have to touch the touchscreen 112 of the first device 100 because the position of the magnet 126 included in the stylus 120a as determined by one or more magnetic sensors 110 included in the first device 100 is used to provide an interface with the first device 100. In accordance with the invention a second device 122a can be in proximity to a first device 100, where the one or more magnetic sensors 110 of the first device 100 can measure the absolute orientation and location of the second device 120a. Vector data corresponding to the absolute orientation and location of the second device 120a within a coordinate system based on the absolute orientation and location of the first device 100 can be mapped to a location on the touchscreen 112 and otherwise used to communicate with the first device 100. Similarly, a system 710 as depicted in FIG. 7B may comprise a first device 100 and a second device, e.g., a stylus 120b, comprising a magnet 126 such as the stylus 120b shown in FIG. 2B, where generally as long as the orientation of the magnet 126 residing in a second device 120b is known, the absolute location and orientation of the magnet 126 residing in the second device 120b can be determined using the vector data provided by the one or more magnetic sensors of the first device 100. It should be noted that the second device could indeed touch the touchscreen of the first device. Further, the first device need not have a touchscreen in the first place but it could have a regular screen.

Figure 8A:
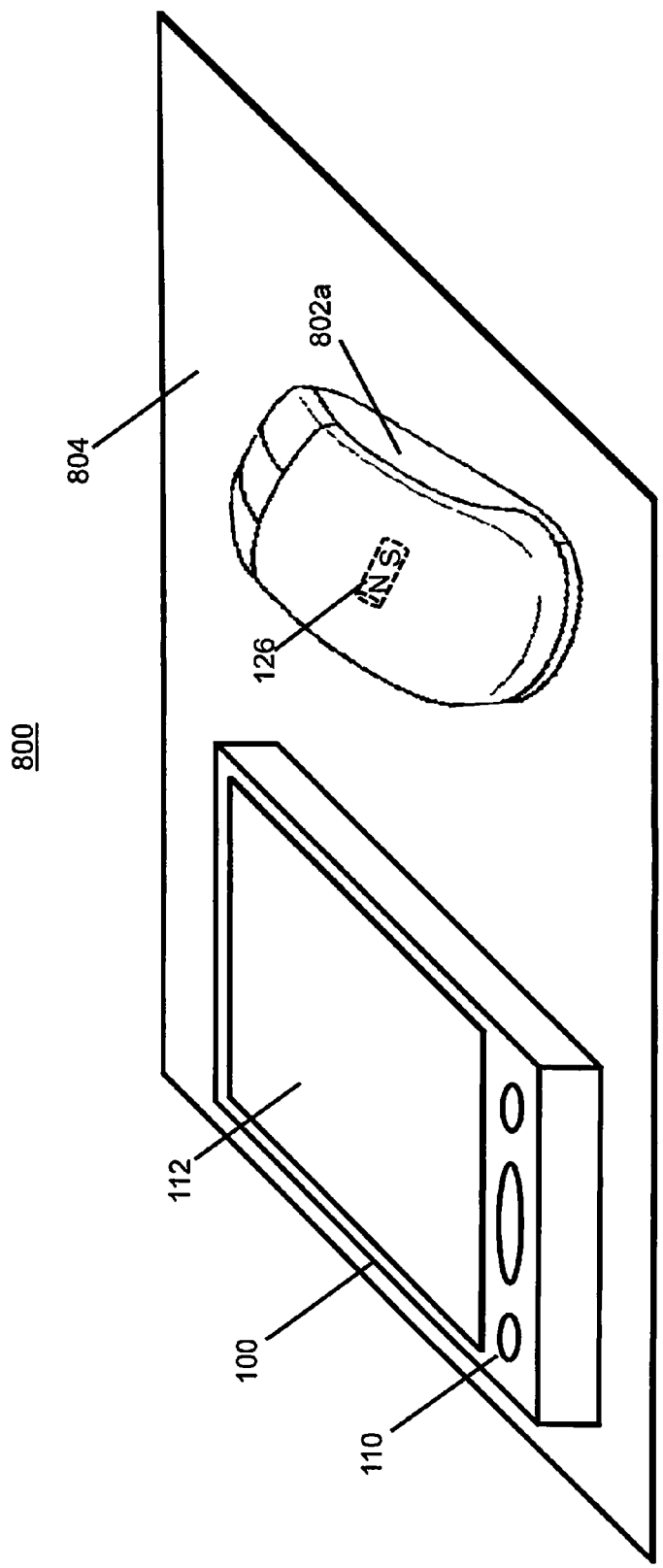
FIG. 8A depicts a system comprising a first device (e.g., a mobile phone) which has a touchscreen (e.g., a capacitive touchscreen) and a second device, e.g., a mouse, which has a magnet having a first orientation where the magnetic moment of the magnet is parallel to a surface on which the mouse resides in accordance with an embodiment of the present invention.
Figure 8B:
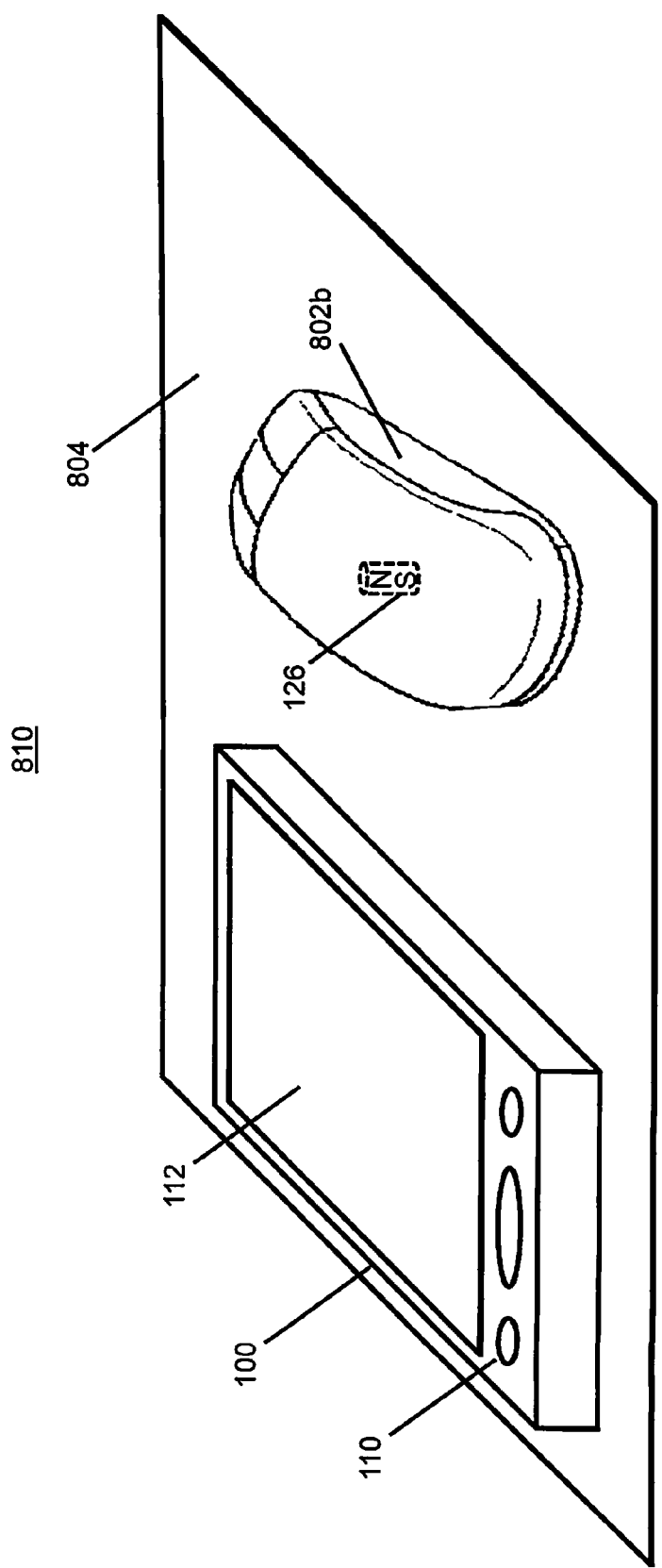
FIG. 8B depicts a system comprising a first device (e.g., a mobile phone) which has a touchscreen (e.g., a capacitive touchscreen) and a second device, e.g., a mouse, which has a magnet having a first orientation where the magnetic moment of the magnet is perpendicular to a surface on which the mouse resides in accordance with an embodiment of the present invention.

As shown in FIG. 8A, a system 800 of the invention may comprise a second device that is a mouse 802a comprising a magnet 126 having a first orientation where the magnetic moment of the magnet 126 is parallel to a surface 804 on which the mouse resides. As shown in FIG. 8B, a system 810 of the invention may comprise a second device that is a mouse 802b comprising a magnet 126 having a second orientation, where the magnetic moment of the magnet 126 is perpendicular to the surface 804 on which the mouse 802b resides.

Figure 9A:
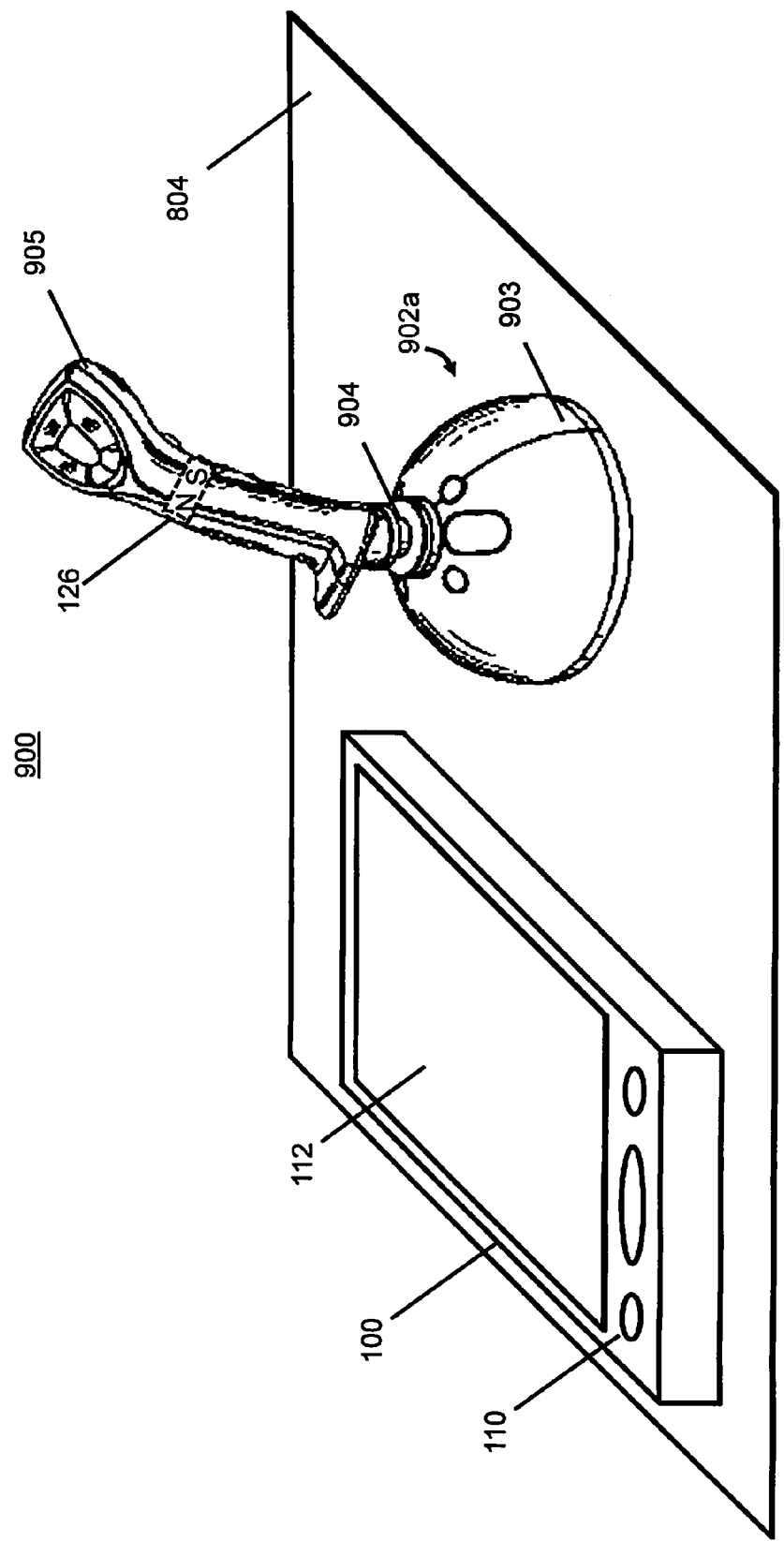
FIG. 9A depicts a system comprising a first device (e.g., a mobile phone) which has a touchscreen (e.g., a capacitive touchscreen) and a second device, e.g., a joy stick input device, which has a base and a control handle with a magnet therein and a base where the magnet has a first orientation that is perpendicular to an axis of an 'at rest' position of the control handle in accordance with an embodiment of the present invention.

FIG. 9A depicts an exemplary system 900 of the invention that comprises a second device that is a joy stick input device 902a comprising a base 903 and control handle 905 configured to pivot within the base 903 at a pivot point 904. The control handle 905 includes a magnet 126 having a first orientation that is perpendicular to an axis of an 'at rest' position of the control handle (i.e., where the moveable portion is at rest when not being held by a user), where the distance between the magnet 126 and a pivot point 904 is known, the distance between the bottom of the base 903 and the pivot point 904 is known. Thus an 'at rest' absolute location and orientation of the control handle 905 can be determined and then used to determine the real time absolute location and orientation of the control handle 905 during operation.

Figure 9B:
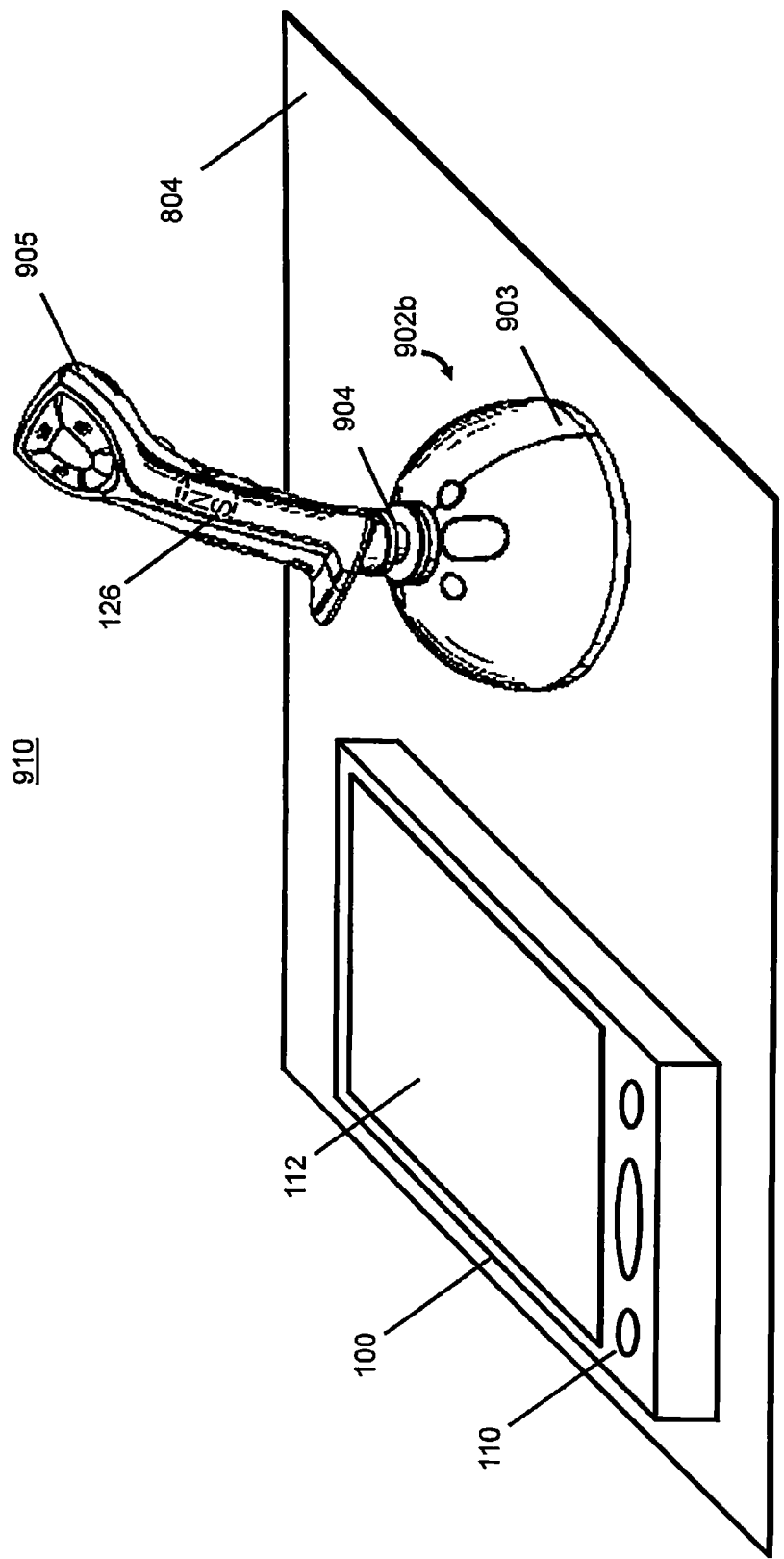
FIG. 9B depicts a system comprising a first device (e.g., a mobile phone) which has a touchscreen (e.g., a capacitive touchscreen) and a second device, e.g., a joy stick input device, which has a base and a control handle with a magnet therein and a base where the magnet has a second orientation that is parallel to an axis of an 'at rest' position of the control handle in accordance with an embodiment of the present invention.

FIG. 9B depicts an exemplary system 910 of the invention that comprises a second device that is a joy stick input device 902b that is like the joy stick input device 902a of FIG. 9A except the magnet has a second orientation that is parallel to an axis of an 'at rest' position of the control handle.

Figure 9C:
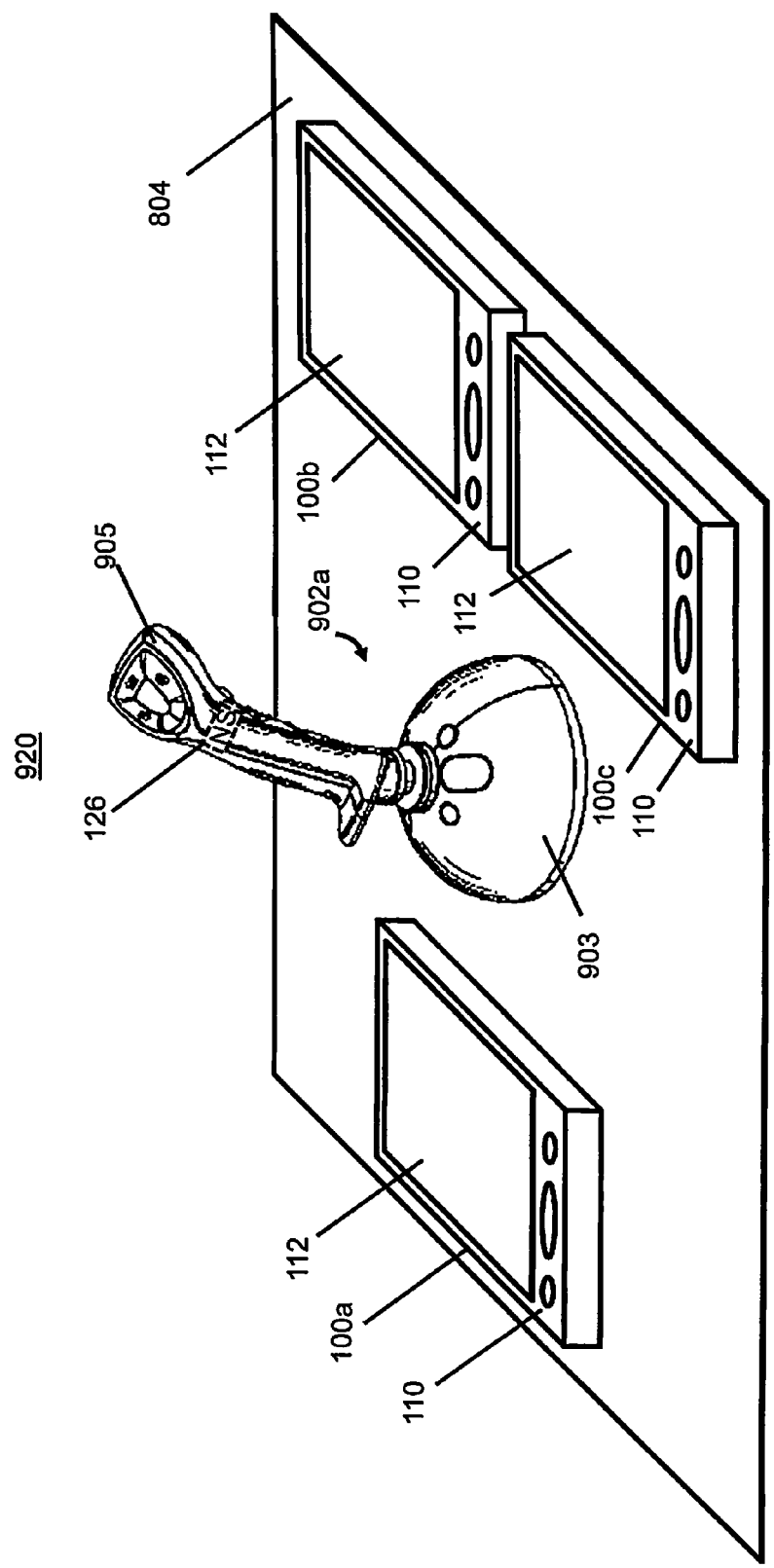
FIG. 9C depicts an exemplary system comprising three first devices which provide multiple detection angles relative to a magnet (which has one polarity orientation) within a second device, e.g., a joy stick input device, in accordance with an embodiment of the present invention.

FIG. 9C depicts an exemplary system 920 of the invention that comprises a second device that is the joy stick input device 902a where the magnetic sensors of three first devices 100a-100c provide multiple detection angles relative to the magnet 126 (which has one orientation) of the joy stick input device 902c.

Figure 9D:
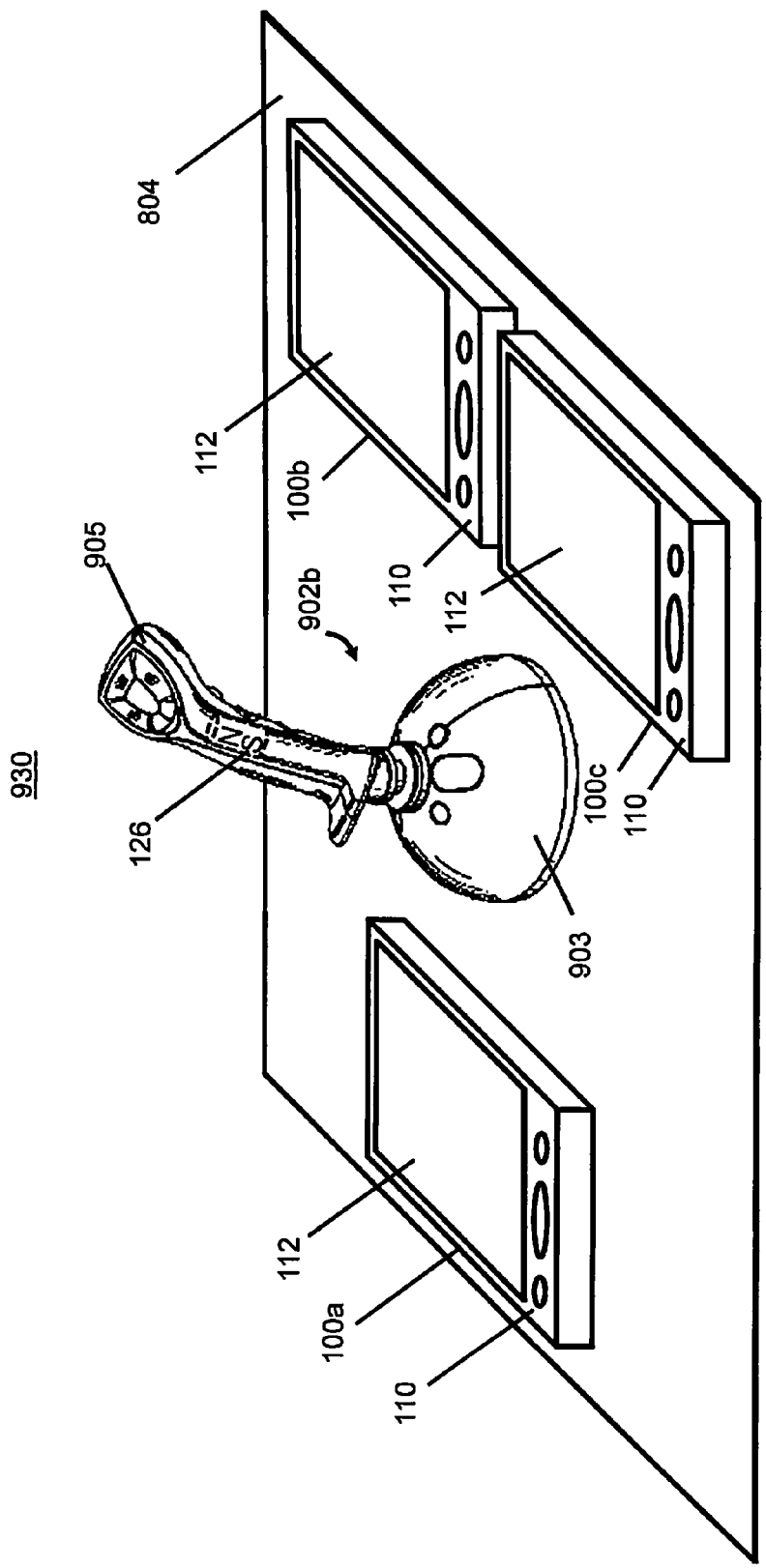
FIG. 9D depicts an exemplary system comprising three first devices which provide multiple detection angles relative to a magnet (which has another polarity orientation) within a second device, e.g., a joy stick input device, in accordance with an embodiment of the present invention.
Figure 11C:
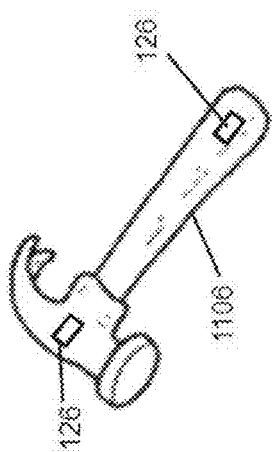
FIGS. 11A-11K depict exemplary second devices that comprise one or more magnets that can be detected by one or more vector magnetic sensors of one or more first devices in accordance with an embodiment of the present invention. In particular, the exemplary second devices shown include: (1) a glove (FIG. 11A); (2) a golf club (FIG. 11B); (3) a tool (FIG. 11C); (4) a pet collar (FIG. 11D); (5) a game controller (FIG. 11E); (6) a vending machine (FIG. 11F); (7) a vehicle (FIG. 11G); (8) a gas pump (FIG. 11H); (9) a cash register (FIG. 11I); (10) an automated teller machine (FIG. 11J); and (11) a first device (FIG. 11K).
Figure 11F:
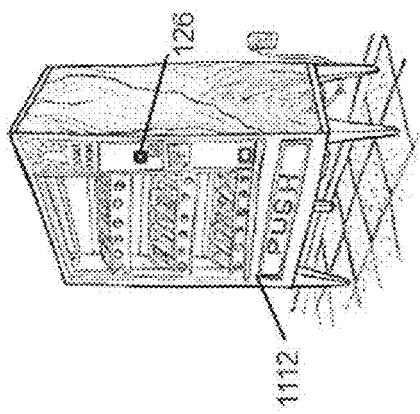
Figure 11B:
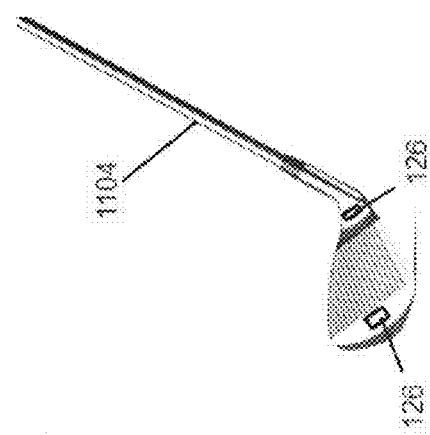
Figure 11E:
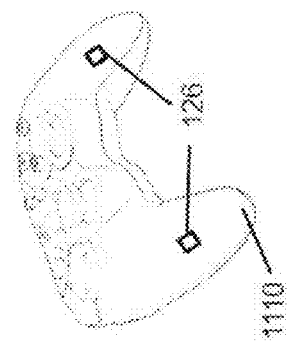
Figure 11A:
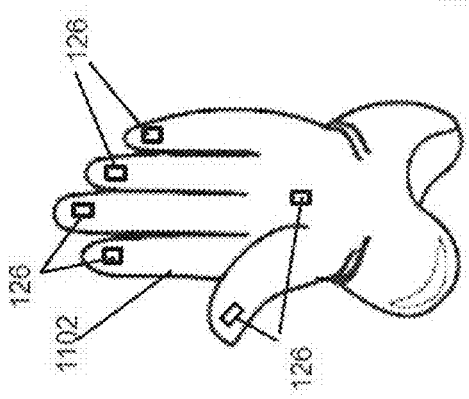
Figure 11D:
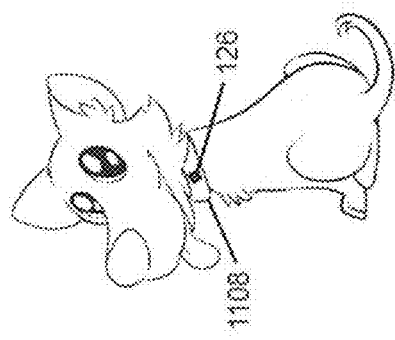
Figure 11I:
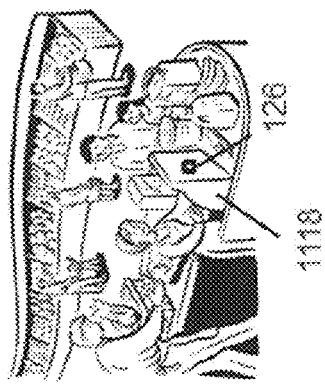
Figure 11K:
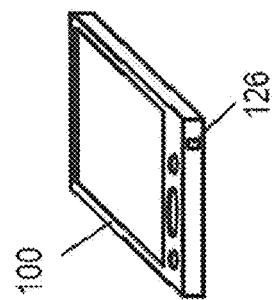
Figure 11H:
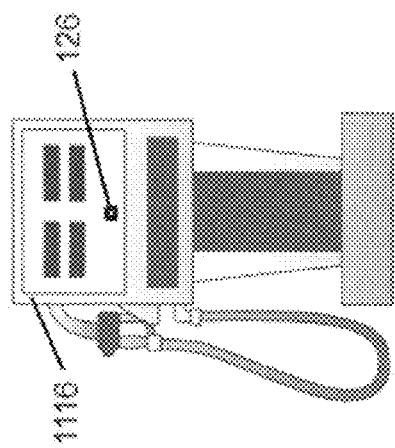
Figure 11J:
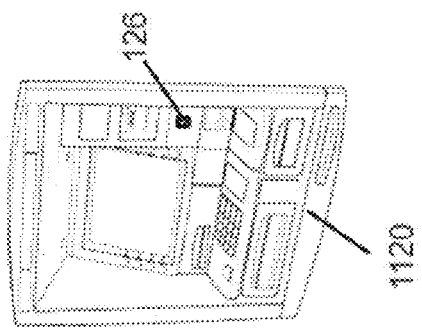
Figure 11G:
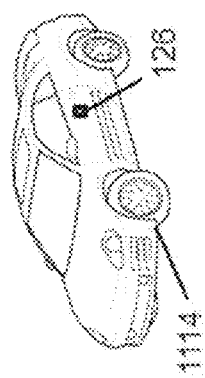

FIG. 9D depicts an exemplary system 930 of the invention that comprises a second device that is the joy stick input device 902b where the magnetic sensors of three first devices 100a-100c provide multiple detection angles relative to the magnet 126, (which has one orientation) of the joy stick input device 902d.

Under one aspect of the invention two or more first devices 100 can communicate using one or more communications capabilities available to the first devices 100 such as cellular communications, WI-FI communications, or the like, to share vector data. One skilled in the art will recognize that having more magnetic sensors and having more detection angles enables ambiguities of orientation and location to be resolved more easily to include ambiguities resulting from the second device including multiple magnets.

FIG. 10A depicts a mouse 802c having two magnets 126a 126b, where each of the two magnets 126a 126 has a first orientation relative to the surface 804 (not shown) and FIG. 10B depicts a mouse 802d, where each of the two magnets 126a 126b has a second orientation relative to the surface 804. FIG. 10C depicts a mouse 802e having two magnets 126a 126b, where one of the magnets 126a has the first orientation relative to the surface 804 and the other one of the magnets 126b has the second orientation relative to the surface 804.

FIG. 10D further depicts a joy stick input device 902c comprising a base 903 and control handle 905 configured to pivot within the base 903 at a pivot point 904. The base 903 includes a first magnet 126a having a first orientation where the magnetic moment of the magnet 126a is parallel to a surface 804 (not shown) on which the joy stick input device 902a resides. The first magnet 126a is located beneath the pivot point 904 of the control handle 905. The control handle 905 has a second magnet 126b having a second orientation that is parallel to an axis of an 'at rest' position of the control handle (i.e., where the moveable portion is at rest when not being held by a user), where the distance between the second magnet 126b and a pivot point 904 is known, the distance between the first magnet 126a and the pivot point 904 is known, and the 'at rest' angle of the control handle 905 is known. Thus an 'at rest' absolute location and orientation of the control handle 905 can be determined and then used to determine the real time absolute location and orientation of the control handle 905 during operation.

FIG. 10E depicts a joy stick input device 902d that is similar to the joy stick input device 902c except the control handle 905 includes two magnets 126b126c having an alternating polarity 'quadrature pole' orientation. FIG. 10F depicts a joy stick input device 902e that is similar to the joy stick input device 902d except the control handle 905 includes three magnets 126b126c126d having polarity orientations corresponding to a Barker 3 code.

One skilled in the art will recognize that all sorts of non-alternating 'coded' magnet patterns can be employed including other one-dimensional arrays (e.g., Barker 4, Barker 5, etc.), two-dimensional arrays, and three-dimensional arrays where the magnets can have the same shapes, sizes and field strengths or could have different combinations of shapes, sizes, and field strengths. Moreover, multi-pole printed magnetic structures can be used. Alternatively, the magnets could be electromagnets or electro-permanent magnets enabling them to be switched on and off, their coding varied, or their magnetic fields to be otherwise varied (e.g., field strength) in accordance with a modulation pattern that can be demodulated as a form of communication whereby wave theory and modulation are applied to magnetometers. For example, magnetic properties could be varied in time as a form of modulation.

Generally, coded patterns of conventional magnets or modulating electromagnets or electro-permanent magnets can be used to provide differentiation from individual magnets that are present in an environment in which the first and second devices are present. As such, a first device can identify and authenticate magnets, electromagnets, or electro-permanent magnets associated with a second device to which the first device desires to interface for position tracking or communications purposes. Coded magnetic structures are described in U.S. Pat. No. 8,179,219, the contents of which are hereby incorporated herein by reference. One skilled in the art will understand that an alternating polarity magnetic field is a uniformly alternating polarity magnetic field, whereas a coded polarity magnetic field is not uniformly alternating, and that one can implement a non-alternating polarity code such as a Barker 4 code (+ + − +) with different sized alternating polarity magnets that produce a non-uniformly alternating (or coded) polarity magnetic field.

FIGS. 11A-11K presents exemplary second devices in accordance with the invention that may comprise one or more magnets that can be detected by one or more vector magnetic sensors of one or more first devices 100. A glove 1102 is shown having magnets 126 in the fingers and in the palm of the glove (see FIG. 11A). A golf club 1104 includes two magnets 126 in the head of the club 1104 (see FIG. 11B). A tool 1106 includes two magnets 126 (see FIG. 11C). A pet collar 1108 includes a magnet 126 (see FIG. 11D). A game controller 1110 includes two magnets 126 (see FIG. 11E). A vending machine 1112 includes a magnet 126 (see FIG. 11F). A vehicle 1114 includes a magnet 126 (see FIG. 11G). A gas pump 1116 includes a magnet 126 (see FIG. 11H). A cash register 1118 at a point of sale includes a magnet 126 (see FIG. 11I). An automated teller machine 1110 includes a magnet 126 (see FIG. 11J). Even a first device 100 can include a magnet 126 so it can be treated as a second device by another first device 100 (see FIG. 11K). Generally, one skilled in the art will understand that in accordance with the invention one or more magnets can be associated with most any object and used for providing high resolution positional input relating to the object (or second device) to a first device having one or more magnetic sensors.

The present invention uses vector data corresponding to the absolute orientation and location of a second device relative to the absolute orientation and location of a first device to calculate the motion of the second device (or the first device) over time. In order to accomplish motion calculations, a calibration process is required where the orientation (e.g., 0 degrees from a plane horizontal to the ground and facing in the X direction) and location (e.g., 0, 0, 0) of the first device within a coordinate system must be established and then the location(s) of the one or more magnets 126 in a second object relative to the orientation and location of the first device must be determined. Then, based on a priori knowledge of the arrangement of the one or more magnets 126 associated with the second device, the absolute orientation and location of the second device can be determined. The calibration process will typically involve moving the second device to locations within a predefined pattern (e.g., points on a square, rectangle, circle, figure eight, etc.) where the second device may be some distance away from (i.e., external to) the first device or the second device may be in contact with or near contact with the first device (e.g., using a display of the first device and locations thereon where the second device is used to draw something, trace something, or identify multiple points on the device). Alternatively, the calibration process could involve moving the first device relative to the second device where the location and orientation of the second device is fixed. The calibration process might involve leaving the first device fixed and moving the second device and then leaving the second device fixed and moving the first. The first device may also include an accelerometer where it can determine whether or not it is moving and can calibrate and re-calibrate motion calculations accordingly (e.g., re-calibrate when it recognizes it is stationary). The system may also recognize conditions whereby it requires a re-calibration process to be performed, for example, it may re-calibrate periodically based on a timing schedule or it may re-calibrate because of the occurrence of an event (e.g., a threshold being met, a time limit being surpassed, a measured value being outside an acceptable range, etc.).

Calibration of a system of the invention may involve determining the orientation and location of the first device relative to one or more magnets associated with one or more second devices located at reference locations within an environment. The one or more reference locations may be associated with a stationary object such as the vending machine 1012, gas pump 1016, cash register 1018, or automated teller machine 1020 of FIG. 10. The magnetic field(s) of the one or more magnets located at a given reference location may be modulated to function as a beacon signal that might, for example, identify the reference location by an identifier or provide the coordinates (e.g., latitude, longitude, altitude) of the reference location within an established coordinate system. Generally, an established modulation method and protocol can be employed such that information can be conveyed to the first device by the one or more magnets at one or more reference locations to enable the first device to determine its position within an environment. One skilled in the art of positioning systems will understand that the number of reference locations interfacing with a first device determines the extent to which the first device can resolve ambiguities to determine its two-dimensional or three-dimensional location, which could be at a point, at one of a plurality of possible points, within an area, or within a volume. Moreover, a first device may move about within an environment whereby the second device(s) with which the first device interfaces varies. Various techniques such as measured magnetic field strength may be used to select among available second devices to be used to determine a location.

Measurements of a vector and local gradient of the magnetic field(s) associated with a magnet(s) of a second device are not required given a priori knowledge of the shape and field strength of the magnetic field(s) of the magnet(s) associated with the second device. Without such a priori knowledge, the vector and local gradient of the magnetic field of a magnet(s) associated with a second device can be measured using the vector data of the one or more sensors of the first device.

The locations of the first device and second device can be determined relative to a location corresponding to location information provided by one or more location information systems such as a Global Positioning System, a Wi-Fi position tracking system, or an Ultra Wideband positioning system.

The movement of a vehicle in which the first device resides, movement of a person holding the first device, or the movement of any other moving object to which the first device is associated with can be determined using the accelerometer capabilities of the first device.

When a second device includes a coded magnetic array such as the Barker 3 array shown in FIG. 10F, multiple arrays of vector magnetic sensors can be used to determine the location and orientation of the second device. Generally, the more complex the coded array, which may be a one-dimensional array, two-dimensional array, or three-dimensional array, the more sensors and computations may need to be applied to resolve ambiguities.

The second device can be a tool (e.g., a scalpel used by a surgeon or even a robot). The second device can be a robotic hand or a finger of a robotic hand.

The vector magnetic sensor array of the first device can track the orientation of a plurality of second devices (e.g., multiple fingers of a robotic hand or the fingers of a glove worn by a person).

The first device can also track orientation of multiple objects such as multiple game pieces near the device (e.g., pieces of a chess game on a game board near a PDA).

Control signals can be conveyed from the first device to the second device to control the movement of the second device (e.g., a feedback control system), where the second device is moved, tracked by the first device, and the first device sends data back to the second device concerning its movement to include new movement instructions.

Alternatively, the second device can be in a fixed location/orientation and the first device can determine its own movement relative to the location/orientation of the second device.

Under one arrangement, a plurality of first devices can be coordinated (e.g., 2 androids providing 2 look angles) to determine information pertaining to a second device.

An authentication scenario for a security door access control system could be as follows:

A person walks up to a security door. The door has a unique id (like an ip address).

The security door has a modulating magnetic source that emits the unique ID of the door. Modulation could be constant (beacon) or it could be strobed based on the door recognizing presence of the phone/person/etc., where it could use any detection method such as radar, IR, Bluetooth, etc. to detect the phone/person/etc.

The phone detects the door (emission), takes the door ID and combines it with its own ID and sends a packet to a server via phone communications.

The server sends the door a validation code that the door uses to produce a validation emission that the phone then sends back to the server to verify proximity to the correct door.

The door knows to open.

With such an authentication approach, most any transaction can be authenticated via ones cellphone.

With a network of modulating magnetic sources (beacons) at known locations within a building, a phone can determine where it's at inside the building as it is moved, for example by a person, about the building.

The beacons would emit their locations (e.g., latitude/longitude/altitude) or provide an identifier that the phone could use with a location look up table.

One of the things that can be made available to the phone is a map of a facility or a home identifying where beacons are in the facility. New beacons can be added and discovered and removed and determined.

If the phone has a compass and an accelerometer, they can be used in combination with the magnetometer to provide information used to interpolate and extrapolate in between beacons.

The phone can verify an environment based on a priori knowledge of the beacon supposedly present and can determine if a beacon is no longer present (for replacement purposes).

Different types of beacons can have different magnetic characteristics (e.g., different throw, different amplitude, different directionality, different coding). Information about the type of beacon (determined based on magnetic characteristics) can provide more information about location, authentication, allow for efficiencies of operation, etc. For example, coils used with electromagnets can be small or very big.

Phones can receive information from RF sources, barcodes, and magnetic stripes.

Two devices each having a magnetometer and a modulating magnetic source can have two-way communications.

Using feedback control, the second device can receive position/motion control information via a wireless link from a first device tracking the position of the second device, which enables the second device to be dumb.

While particular embodiments of the invention have been described, it will be understood, however, that the invention is not limited thereto, since modifications may be made by those skilled in the art, particularly in light of the foregoing teachings.

The invention claimed is:

1. A system comprising:
a first device comprising a screen and at least one vector magnetic sensor that senses the magnetic field produced by the Earth;
a second device comprising a magnet;
the first device utilizes the at least one vector magnetic sensor which interfaces with the magnet in the second device to obtain vector data which corresponds to an absolute orientation and location of the second device within a coordinate system based on an absolute orientation and location of the first device; and
the first device utilizes the vector data to map the location of the second device to a location on the screen.

2. The system of claim 1, wherein the first device further utilizes the vector data to map the motion of the second device to the screen.

3. The system of claim 1, wherein:
the first device conveys control signals to the second device to control movement of the second device.

4. The system of claim 1, wherein:
the second device is a stylus with a head and a handle, wherein the head contains the magnet that is orientated such that a corresponding magnetic pole is substantially perpendicular to a lengthwise direction of the handle; or
the second device is a stylus with a head and a handle, wherein the head contains the magnet that is orientated such that a corresponding magnetic pole is substantially parallel to a lengthwise direction of the handle.

5. The system of claim 1, wherein:
the second device is a mouse which has the magnet with a first orientation where a magnetic moment of the magnet is parallel to a surface on which the mouse resides; or
the second device is a mouse which has the magnet with a second orientation where a magnetic moment of the magnet is perpendicular to a surface on which the mouse resides.

6. The system of claim 1, wherein:
the second device is a mouse which has two magnets both with a first orientation where two magnetic moments of the two magnets are parallel to a surface on which the mouse resides; or
the second device is a mouse which has two magnets both with a second orientation where two magnetic moments of the two magnets are perpendicular to a surface on which the mouse resides; or
the second device is a mouse which has a first magnet and a second magnet, wherein the first magnet has a first orientation where a magnetic moment of the first magnet is parallel to a surface on which the mouse resides, and wherein the second magnet has a second orientation where a magnetic moment of the second magnet is perpendicular to said surface on which the mouse resides.

7. The system of claim 1, wherein:
the second device is a joy stick input device comprising a base and a control handle, wherein the control handle is configured to pivot within the base at a pivot point, and wherein the control handle has the magnet with a first orientation that is perpendicular to an axis of an at rest position of the control handle; or
the second device is a joy stick input device comprising a base and a control handle, wherein the control handle is configured to pivot within the base at a pivot point, and wherein the control handle has the magnet with a second orientation that is parallel to an axis of an at rest position of the control handle.

8. The system of claim 1, wherein:
the second device is a joy stick input device comprising a base and a control handle, wherein the control handle is configured to pivot within the base at a pivot point, wherein the control handle has the magnet with an orientation that is perpendicular to an axis of an at rest position of the control handle, and wherein the base has a second magnet with a magnetic moment that is parallel to a surface on which the joy stick input device resides; or
the second device is a joy stick input device comprising a base and a control handle, wherein the control handle is configured to pivot within the base at a pivot point, wherein the control handle has the magnet and a second magnet which collectively have an alternating polarity orientation that is parallel to an axis of an at rest position of the control handle, and wherein the base has a third magnet with a magnetic moment that is parallel to a surface on which the joy stick input device resides; or
the second device is a joy stick input device comprising a base and a control handle, wherein the control handle is configured to pivot within the base at a pivot point, wherein the control handle has the magnet and two additional magnets which collectively have polarity orientations corresponding to a Barker 3 code and have orientations that are parallel to an axis of an at rest position of the control handle, and wherein the base has a magnet with a magnetic moment that is parallel to a surface on which the joy stick input device resides.

9. The system of claim 1, further comprising:
at least two more first devices each of which has at least one vector magnetic sensor; and
the second device is a joy stick input device comprising a base and a control handle, wherein the control handle is configured to pivot within the base at a pivot point, wherein the control handle has the magnet which has a predetermined orientation to an axis of an at rest position of the control handle;
the first device and the at least two more first devices utilize their respective at least one vector magnetic sensor which interfaces with the magnet in the second device to obtain respective vector data corresponding to an absolute orientation and location of the control handle within a coordinate system based on an absolute orientation and location of the respective first device and the at least two more first devices; and
the first device obtains the vector data from the at least two more first devices and uses all of the vector data to map the location of the control handle to a location on the screen.

10. The system of claim 1, wherein the screen is a touchscreen.

11. A system comprising:
a first device comprising a screen and at least one vector magnetic sensor;
a second device comprising a magnet;
the first device utilizes the at least one vector magnetic sensor which interfaces with the magnet in the second device to obtain vector data which corresponds to an absolute orientation and location of the second device within a coordinate system based on an absolute orientation and location of the first device; and
the first device utilizes the vector data to map the location of the second device to a location on the screen, wherein the first device performs a calibration process prior to enabling the motion of the second device to be mapped to the screen, wherein the first device further utilizes the vector data to map the motion of the second device to the screen, wherein the calibration process comprises:
determine the absolute orientation and location of the first device within the coordinate system;
determine a location of the magnet in the second device relative to the orientation and location of the first device; and
determine the absolute orientation and location of the second device based on a priori knowledge of an arrangement of the magnet in the second device.

12. The system of claim 11, wherein the calibration process further comprises one of the following:
moving the second device to locations within a predefined pattern where the second device is some distance away from the first device or the second device is in contact with or near contact with the first device;
moving the first device relative to the second device where the orientation and location of the second device is fixed; or
leaving the first device fixed and moving the second device and then leaving the second device fixed and moving the first device.

13. A system comprising:
a first device comprising a screen and at least one vector magnetic sensor;
a second device comprising a magnet;
the first device utilizes the at least one vector magnetic sensor which interfaces with the magnet in the second device to obtain vector data which corresponds to an absolute orientation and location of the second device within a coordinate system based on an absolute orientation and location of the first device; and
the first device utilizes the vector data to map the location of the second device to a location on the screen, wherein the second device incorporates the magnet and at least one other magnet, wherein the magnet and the at least one other magnet is a coded magnetic array.

14. The system of claim 1, further comprising:
additional first devices each of which incorporate at least one vector magnetic sensor, wherein the first device and the additional first devices utilize their respective at least one vector magnetic sensor to interface with said magnet in said second device to obtain vector data which corresponds to said absolute orientation and location of said second device within the coordinate system based on the absolute orientations and locations of the first device and the additional first devices.

15. A first device which interfaces with a second device that has a magnet, the first device comprising:
a screen;
at least one vector magnetic sensor that senses the magnetic field produced by the Earth;
a processor; and
a memory that stores processor-executable instructions where the processor interfaces with the memory and executes the processor-executable instructions to enable the following operations:
interface with second device which comprises a magnet;
obtain vector data which corresponds to an absolute orientation and location of the second device within a coordinate system based on an absolute orientation and location of the first device; and
utilize the vector data to map the location of the second device to a location on the screen.

16. The first device of claim 15, wherein the processor further executes the processor-executable instructions to utilize the vector data to map the motion of the second device to the screen.

17. The first device of claim 15, wherein the processor further executes the processor-executable instructions to:
interface with additional first devices each of which incorporate at least one vector magnetic sensor;
utilize the at least one vector magnetic sensor in each additional first device to obtain vector data which corresponds to said absolute orientation and location of said second device within the coordinate system based on the absolute orientations and locations of the first device and the additional first devices.

18. The first device of claim 15, wherein the processor further executes the processor-executable instructions to convey control signals to the second device to control movement of the second device.

19. The first device of claim 15, wherein the screen is a touchscreen.

20. A first device which interfaces with a second device that has a magnet, the first device comprising:
a screen;
at least one vector magnetic sensor;
a processor; and a memory that stores processor-executable instructions where the processor interfaces with the memory and executes the processor-executable instructions to enable the following operations:

interface with second device which comprises a magnet;

obtain vector data which corresponds to an absolute orientation and location of the second device within a coordinate system based on an absolute orientation and location of the first device; and utilize the vector data to map the location of the second device to a location on the screen, wherein the processor further executes the processor-executable instructions to utilize the vector data to map the motion of the second device to the screen, wherein the processor further executes the processor-executable instructions to perform a calibration process prior to enabling the motion of the second device to be mapped to the screen, wherein the calibration process comprises:

determine the absolute orientation and location of the first device within the coordinate system;

determine a location of the magnet in the second device relative to the orientation and location of the first device; and determine the absolute orientation and location of the second device based on a priori knowledge of an arrangement of the magnet in the second device.

21. A method implemented by a first device which interfaces with a second device, wherein the first device comprises a screen and at least one vector magnetic sensor that senses the magnetic field produced by the Earth, and wherein the second device comprises a magnet, the method comprising:

obtaining vector data which corresponds to an absolute orientation and location of the second device within a coordinate system based on an absolute orientation and location of the first device; and utilizing the vector data to map the location of the second device to a location on the screen.

22. The method of claim 21, further comprising utilizing the vector data to map the motion of the second device to the screen.

23. The method of claim 21, further comprises:

interfacing with additional second devices each of which incorporate a magnet;

utilizing the at least one vector magnetic sensor which interfaces with the magnet in each additional second device to obtain vector data which corresponds to an absolute orientation and location of each additional second device within the coordinate system based on the absolute orientation and location of the first device; and utilize the vector data to map the location of each additional second device to a location on the screen, wherein each additional second device does not touch the screen of the device.

24. The method of claim 21, further comprising conveying control signals to the second device to control movement of the second device.

25. The method of claim 21, wherein the screen is a touchscreen.

26. The method of claim 25, wherein the second device does not touch the touchscreen of the first device.

27. A method implemented by a first device which interfaces with a second device, wherein the first device comprises a screen and at least one vector magnetic sensor, and wherein the second device comprises a magnet, the method comprising:

obtaining vector data which corresponds to an absolute orientation and location of the second device within a coordinate system based on an absolute orientation and location of the first device; and utilizing the vector data to map the location of the second device to a location on the screen;

utilizing the vector data to map the motion of the second device to the screen; and performing a calibration process prior to mapping the motion of the second device to the screen, wherein the calibration process comprises:

determining the absolute orientation and location of the first device within the coordinate system;

determining a location of the magnet in the second device relative to the orientation and location of the device; and determining the absolute orientation and location of the second device based on a priori knowledge of an arrangement of the magnet in the second device.

* * * * *